United States Patent
Barshow et al.

(10) Patent No.: US 10,270,780 B2
(45) Date of Patent: Apr. 23, 2019

(54) ACCESS MANAGEMENT USING ELECTRONIC IMAGES

(71) Applicant: Dropbox, Inc., San Francisco, CA (US)

(72) Inventors: David Barshow, Menlo Park, CA (US); Belinda Preno, San Francisco, CA (US); George Milton Underwood, IV, Palo Alto, CA (US); Linda Eliasen, San Francisco, CA (US); Anthony DeVincenzi, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/585,039

(22) Filed: Dec. 29, 2014

(65) Prior Publication Data
US 2016/0050211 A1    Feb. 18, 2016

Related U.S. Application Data

(60) Provisional application No. 62/038,751, filed on Aug. 18, 2014.

(51) Int. Cl.
  H04L 29/06 (2006.01)
  H04L 12/58 (2006.01)
  (Continued)

(52) U.S. Cl.
  CPC .......... *H04L 63/102* (2013.01); *G06F 3/0484* (2013.01); *G06F 21/36* (2013.01); *G06Q 10/107* (2013.01); *H04L 51/22* (2013.01)

(58) Field of Classification Search
  CPC ..... H04L 63/102; G06F 3/0484; G06F 21/56; G06F 21/36; G06F 21/10; G06F 21/62; G06F 21/123
  See application file for complete search history.

(56) References Cited

U.S. PATENT DOCUMENTS

| | | | |
|---|---|---|---|
| 6,005,936 A | | 12/1999 | Shimizu et al. |
| 6,118,872 A | * | 9/2000 | Kashima ............ G06F 21/36 380/205 |

(Continued)

FOREIGN PATENT DOCUMENTS

| | | |
|---|---|---|
| EP | 2747374 A1 | 6/2014 |
| JP | 2000-315179 | 11/2000 |

(Continued)

OTHER PUBLICATIONS

International Search Report and Written Opinion dated Sep. 4, 2015 in Int'l Patent Application No. PCT/US2015/038298, 11 pages.

*Primary Examiner* — Eleni A Shiferaw
*Assistant Examiner* — Sher A Khan
(74) *Attorney, Agent, or Firm* — DLA Piper LLP US

(57) ABSTRACT

Techniques are described for an access management system to manage access to a service (e.g., a message management service). A client can receive a message including an electronic image from a messaging service. The electronic image can include access information for obtaining access to a message management service. Input is received that indicates interaction with the electronic image in an interface. The client can send, to the access management system, the electronic image to request access to the message management service based on the access information. Authorization is received from the access management system indicating that the account can access the message management service. The client displays an interface to provide access to the message management service. The access to the message management service can be based on the authorization.

21 Claims, 18 Drawing Sheets

(51) Int. Cl.
*G06F 3/0484* (2013.01)
*G06F 21/36* (2013.01)
*G06Q 10/10* (2012.01)

(56) References Cited

U.S. PATENT DOCUMENTS

| | | | | |
|---|---|---|---|---|
| 6,583,813 | B1* | 6/2003 | Enright | G06Q 20/18 348/143 |
| 6,920,482 | B1 | 7/2005 | Fujiyoshi | |
| 7,315,946 | B1* | 1/2008 | Blumenfeld | G06F 12/1458 711/E12.093 |
| 7,437,457 | B1* | 10/2008 | Eisendrath | H04L 63/10 709/204 |
| 7,734,930 | B2 | 6/2010 | Kirovski et al. | |
| 7,942,314 | B1* | 5/2011 | Grimm | G06Q 20/042 235/375 |
| 8,336,086 | B2* | 12/2012 | Seo | G06F 21/36 713/182 |
| 9,009,814 | B1* | 4/2015 | Wertz | G06F 21/46 713/168 |
| 9,300,611 | B2* | 3/2016 | Mody | H04L 51/10 |
| 9,843,446 | B2* | 12/2017 | Mityagin | H04L 9/0891 |
| 2003/0177366 | A1* | 9/2003 | de Jong | G06F 21/34 713/184 |
| 2004/0153715 | A1* | 8/2004 | Spaeth | G06Q 20/202 714/4.11 |
| 2006/0294192 | A1* | 12/2006 | Mao | H04L 67/306 709/213 |
| 2007/0030123 | A1* | 2/2007 | Hoblit | G06F 21/31 340/5.81 |
| 2007/0266428 | A1* | 11/2007 | Downes | G06F 21/36 726/5 |
| 2008/0177994 | A1* | 7/2008 | Mayer | G06F 9/4418 713/2 |
| 2009/0003731 | A1* | 1/2009 | Nitta | G06F 3/1423 382/298 |
| 2009/0288012 | A1* | 11/2009 | Hertel | G06Q 20/02 715/738 |
| 2010/0115591 | A1* | 5/2010 | Kane-Esrig | G06F 21/36 726/5 |
| 2010/0149399 | A1* | 6/2010 | Mukai | G01C 21/20 348/333.02 |
| 2010/0162351 | A1* | 6/2010 | Lee | G06F 21/10 726/1 |
| 2011/0058210 | A1* | 3/2011 | Aizono | H04L 9/32 358/1.14 |
| 2011/0208716 | A1* | 8/2011 | Liu | G06F 17/30247 707/710 |
| 2012/0011575 | A1 | 1/2012 | Cheswick et al. | |
| 2012/0151560 | A1 | 6/2012 | Farsedakis | |
| 2012/0180115 | A1 | 7/2012 | Maitland | |
| 2012/0230577 | A1* | 9/2012 | Calman | G06Q 20/042 382/138 |
| 2012/0246737 | A1* | 9/2012 | Paxton | G06F 21/316 726/27 |
| 2013/0007875 | A1* | 1/2013 | Jakobsson | G06F 21/36 726/19 |
| 2013/0024795 | A1* | 1/2013 | Robotham | G06F 3/0486 715/769 |
| 2013/0036342 | A1* | 2/2013 | Deo | G06Q 30/02 715/202 |
| 2013/0036461 | A1* | 2/2013 | Lowry | G06F 21/36 726/19 |
| 2013/0067374 | A1* | 3/2013 | Dantec | G06F 9/4443 715/769 |
| 2013/0106916 | A1* | 5/2013 | Guo | G06F 21/36 345/672 |
| 2013/0212270 | A1* | 8/2013 | Hsieh | H04L 67/32 709/225 |
| 2013/0263237 | A1* | 10/2013 | Kumaraswamy | G06F 21/36 726/7 |
| 2013/0275517 | A1 | 10/2013 | Jalkanen et al. | |
| 2013/0346740 | A1 | 12/2013 | Mirashrafi et al. | |
| 2014/0047331 | A1 | 2/2014 | Feldman et al. | |
| 2014/0047527 | A1* | 2/2014 | Ngo | H04L 63/08 726/7 |
| 2014/0150080 | A1* | 5/2014 | Miller | G06F 21/10 726/9 |
| 2014/0173695 | A1* | 6/2014 | Valdivia | G06F 21/36 726/4 |
| 2014/0180798 | A1* | 6/2014 | Bailey | G06Q 30/0277 705/14.45 |
| 2014/0223319 | A1* | 8/2014 | Uchida | G06F 17/30277 715/739 |
| 2014/0230039 | A1* | 8/2014 | Prakash | G06F 21/35 726/9 |
| 2014/0330870 | A1* | 11/2014 | Lissack | G06F 17/3007 707/783 |
| 2015/0026785 | A1* | 1/2015 | Soon-Shiong | G06Q 30/0207 726/7 |
| 2015/0242086 | A1* | 8/2015 | Mindlin | G06F 3/0481 715/769 |

FOREIGN PATENT DOCUMENTS

| | | |
|---|---|---|
| JP | 2004-021722 | 1/2004 |
| JP | 2004-151970 | 5/2004 |
| JP | 2007-299411 | 11/2007 |
| JP | 2009-230198 A | 10/2009 |
| JP | 2010-074290 | 4/2010 |
| JP | 2012-014434 | 1/2012 |

\* cited by examiner

ACCESS MANAGEMENT USING ELECTRONIC IMAGES

CROSS-REFERENCES TO RELATED APPLICATIONS

The present application claims priority and benefit from U.S. Provisional Application No. 62/038,751, filed Aug. 18, 2014, entitled "ACCESS MANAGEMENT USING ELECTRONIC IMAGES," the entire content of which is incorporated herein by reference for all purposes.

BACKGROUND

The present disclosure relates generally to service management systems and in particular to techniques for using electronic images to manage access to a service management system.

In recent years, electronic messaging services have increased in popularity. Users may establish an account with a service management system to obtain access to a messaging service from different client devices. Some users may install an application (e.g., an "app"), which can enable them to communicate with the service management system.

New or refined features provided by service management systems may initially be provided through limited releases, sometimes referred to as "beta" releases. A limited release may allow a service management system to test and evaluate its new or refined features before they are released service-wide. Some service management systems can stand to benefit from techniques which can enable them to better control access to their systems. Such techniques may be useful to enable a service management system to control release of new features or functions and to encourage users to use the service management system.

SUMMARY

Accordingly, certain embodiments of the present invention relate to techniques for managing access to a service (e.g., a message management service or an online content management service) provided by a service management system. Some service management systems manage release of a service and/or its features through a release directed to a limited group of users. Such a release can be designed to encourage use of the service and/or features as part of a selected group of users. Without additional incentive or motivation, some of the selected users may not use or try all the features of the service such that use of the service can be thoroughly evaluated. Service management systems may be challenged to find ways to attract users to regularly test all the features of theirs services. Some operators may benefit from techniques that can enable users to invite other users to use the service and/or the features. Some embodiments of the present invention provide for techniques that enable distribution of electronic images (e.g., a coin) to manage (e.g., license or control) access to a service (e.g., a message management service or an online content management service) or service features. The electronic images can be provided to others, thereby encouraging other users to access the service. Additional electronic images can be distributed and collected to obtain access to additional or new features.

Certain embodiments of the present disclosure include distributing an electronic image to a user via an electronic message (e.g., an email message). A user can interact with an electronic image at a client device to redeem the electronic image to access a service. Access information in an electronic image can be used to determine authorization to access the service when requested. In some embodiments, the access information can be sent from a client device to the service and used to determine whether the client device is authorized to access the service. This prevents an unauthorized user from operating a client device to access the service using the access information.

Access information in an electronic image can include a value (e.g., a security key, a hash value, or some other security information), which upon verification, can grant an account a permission (e.g., a license or authorization) to access a service and/or to access one or more of the following provided by a service: a function, a feature, an operation, an option, a method, or combinations thereof. In some embodiments, access to a service can be controlled for an account that is granted authorization based on redeeming an electronic image. An electronic image can be considered used (e.g., redeemed) when access to the service is granted for an account of a user that requested access using the electronic image.

In some embodiments, access to a service can be based on one or more criteria (e.g., a condition, a rule, or an event). Access to a service can be based on use of the service or use of one or more features or functions of the service. In some embodiments, access to a service can be based on type of actions, such as a user practice (e.g., maintaining an empty message inbox or removing all spam messages), specific use of the service, or other types of actions. Such criteria can be defined to encourage users to a service more often. In some embodiments, access to a service can be controlled based on redemption of multiple electronic images.

Users can be provided with additional electronic images to obtain access to one or more features of message management services based on use of the service. In doing so, new features can be "unlocked" if the service is used in a particular manner. For example, access to the new features can be permitted based on use of the service, thereby further encouraging users to use the service in hopes of obtaining additional electronic images. Users can encourage other users to access the service by providing electronic images to other users. In some embodiments, users can be provided with additional electronic images to access a service based on other use of the service by other users that access the service with the disseminated electronic images. Use of different features of a service can enable a service management system to determine user preferences and feedback regarding features of the service. Such information can be useful to enable the service management system to determine changes in offerings or improvements to the service.

In some embodiments, an electronic image, when displayed, can indicate a status related to use of the access information to access a service. For example, an electronic image can include information indicating the status. When an electronic image including access information is displayed, the electronic image can indicate the status. The status can indicate a feature of a service that can be accessed using the electronic image. The status can indicate whether the electronic image has been used to access the service and if so, whether authorization was granted.

Certain embodiments of the present invention relate to techniques for managing access to a service. Such techniques can be implemented by a computer system of an access management system. The access management system can be implemented by a client. In some embodiments, the computer system can include or implement a computing device. The computer system can include a memory and a processor coupled to the memory. The processor can be configured to perform a method. The method can include obtaining access information in an electronic image for accessing a message management service. In some embodiments, the access information includes a security key that is generated using a hash operation. In some embodiments, the access information is included in metadata of the electronic image. In some embodiments, the account provides access to an online content management service.

The method can further include receiving input corresponding to an interaction with the electronic image in a first graphical interface associated with the message management service. The method can further include sending to a computing device associated with the message management service, the electronic image to request access to the message management service. Authorization to access the message management service is determined using the access information in the electronic image. In some embodiments, the electronic image is sent to request access to the message management service from the computer system by an account provided by the message management service. The authorization information can indicate authorization for the account to access the message management service. The method can further include receiving authorization information indicating the authorization to access the message management service. In some embodiments, the authorization information grants authorization to access a feature of the message management service and the second graphical interface provides access to the feature based on the received authorization information. In some embodiments, the second graphical interface includes one or more interactive elements to install an application to access message management service.

In some embodiments, the method includes receiving, from a messaging service, a message associated with a messaging account provided by the messaging service, where the message includes the electronic image.

In some embodiments, the method includes determining, using the electronic image, a status corresponding to use of the access information to access the message management service, where the electronic image is displayed in the first graphical interface with an appearance that indicates the status.

In some embodiments, the method can further include receiving input corresponding to an interaction with the second graphical interface. The interaction can correspond to a request to the message management service. The method can further include sending, to the message management service, data indicating the request. The method can further include receiving, from the message management service, an additional electronic image including additional access information for obtaining access to a feature provided by the message management service. In some embodiments, the method can further include sending, to the message management service, a request to access the feature. The request can include the additional electronic image. The method can further include receiving, from the message management service, additional authorization information indicating authorization of the account to access the feature using the computer system. The method can further include displaying, based on the received additional authorization information, a third graphical interface that provides access to the feature of the message management service.

Certain embodiments of the present invention relate to techniques for managing access to a service. Such techniques can be implemented by a computer system of an access management system. The access management system can be implemented by a message management service. In some embodiments, the computer system can include or can implement a computing device. The computer system can include a memory and a processor coupled to the memory. The processor can be configured to perform a method. The method can include receiving a first request to access the message management service using a first computer system. The first request can include an electronic image including access information. The method can include verifying authorization to access the message management service based on the access information. In some embodiments, authorization can be verified using the derived security key and the security key. In some embodiments, verifying authorization can include determining whether access to the message management service has previously been authorized using the access information. The method can include sending to the first computer system authorization information indicating authorization to access the message management service. In some embodiments, the authorization information can indicate whether authorization to access the message management service is denied.

In some embodiments, the method can include generating the access information using a security key for accessing the message management service. The access information includes a derived security key that is generated based on the security key.

In some embodiments, the method can include determining a status corresponding to use of the access information to access the message management service. The electronic image can include the determined status.

In some embodiments, the method can further include receiving, from a second computer system, a second request to access the message management. The second request can include the electronic image that includes the access information. The method can include determining authorization to access the message management service from the additional computer system. The method can include determining that authorization to access the message management service has already been granted based on the access information. The method can include sending, to the second computer system, a message indicating that authorization to access the message management service from the second computer system is denied.

The following detailed description together with the accompanying drawings will provide a better understanding of the nature and advantages of the present invention.

DETAILED DESCRIPTION

Figure 1:
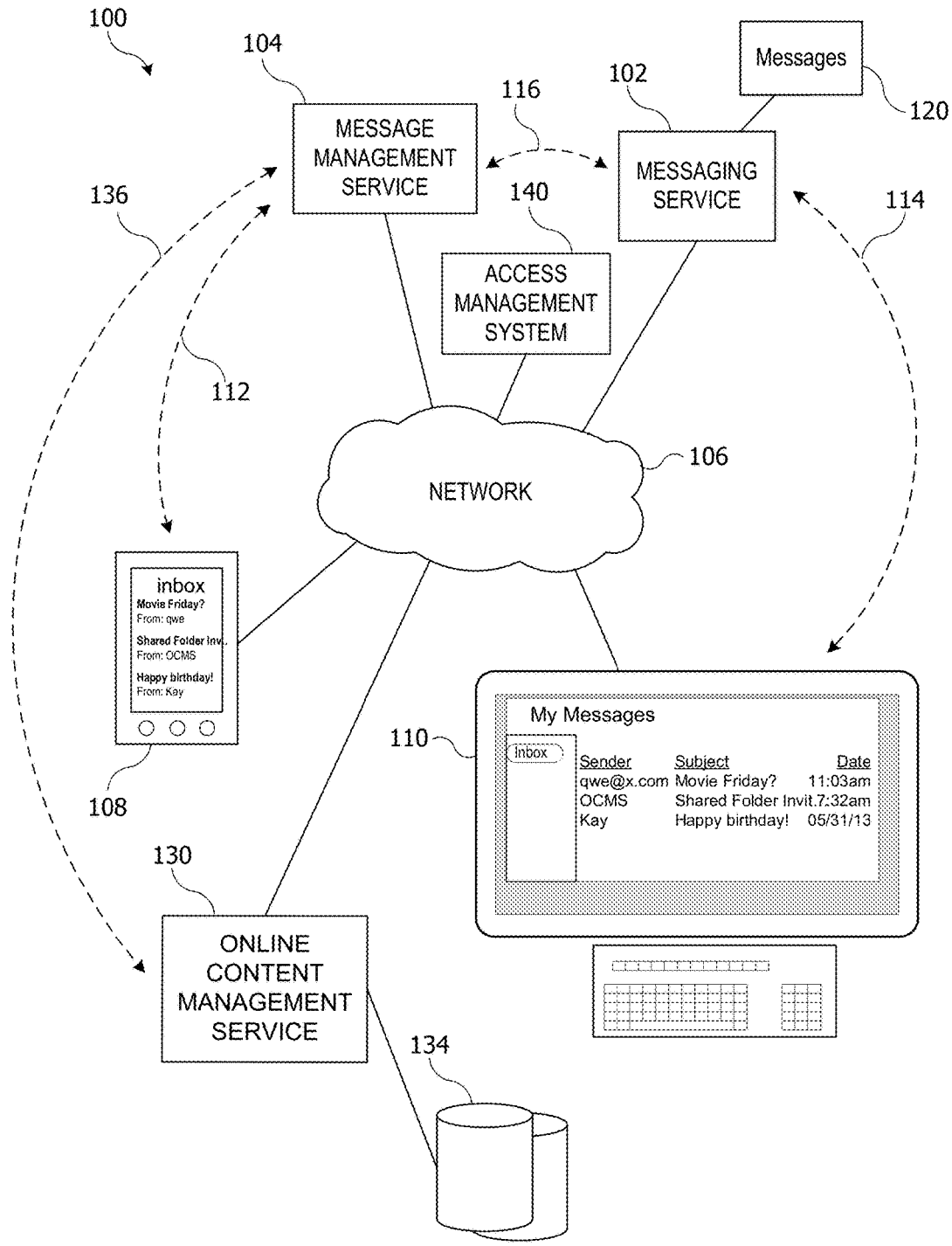
FIG. 1 shows a block diagram of a communication system according to an embodiment of the present invention.

Accordingly, certain embodiments of the present invention relate to techniques for managing access to a service (e.g., a message management service or an online content management service) provided by a service management system. Some embodiments of the present invention provide for techniques regarding distribution of electronic images, which can be used to manage (e.g., license or control) access to a service through the right(s) granted to a user of the electronic image who requests access to the service.

Certain embodiments of the present disclosure enable management of access to a service (e.g., a message management service or an online content management service) through distribution of electronic images (e.g., a coin), each of which can include access information. An electronic image can be distributed to users via an electronic message (e.g., an email message). A user can interact with an electronic image (e.g., drag an electronic image into a receptacle) in an interface of an application at a client device to redeem the electronic image to access the service. Interaction with the electronic image can cause access for an account of the user to be requested from the service. The access information in an electronic image can be used to determine authorization to access the service when requested. In some embodiments, the access information can be sent from a client device to the service and used to determine whether the client device is authorized to access the service. This prevents an unauthorized user from operating a client device to access the service using the access information.

Access information in an electronic image can include a value (e.g., a security key, a hash value, or some other security information), which upon verification, can provide an account a permission (e.g., a license or authorization) to access a service and/or to access one or more of the following provided by a service: a function, a feature, an operation, an option, a method, or combinations thereof. In some embodiments, access to a service can be controlled for an account that is granted authorization based on redeeming an electronic image. An electronic image can be considered used (e.g., redeemed) when access to the service is provided to an account of a user that requested access using the electronic image. In some embodiments, access information in an electronic image can be used to grant access to certain features of a service. In some embodiments, access to a service can be controlled based on redemption of multiple electronic images, each of which can contain different access information.

In certain embodiments, access to a service can be managed using one or more data structures storing access information (e.g., a security key) that can be used to determine authorization for an account to access a service. One or more security keys can be derived (e.g., using a hash operation) from a security key (e.g., a master security key). A security key can be associated with one or more rights for accessing a service. Using the data structures, access information can be verified to determine whether an account is permitted to access the service based on access information.

In some embodiments, access to a service can be based on one or more criteria (e.g., a condition, a rule, or an event). A criterion related to access of a service can be based on use of the service or use of one or more features or functions of the service. In some embodiments, a criterion can be defined based on type of actions, such as a user practice (e.g., maintaining an empty message inbox or removing all spam messages), specific use of the service, or other types of actions. Such criterion can be defined to encourage users to use a service more often.

Users can be provided with additional electronic images that include access information to use one or more new or different features of message management services, which were previously unavailable. In doing so, new features can be "unlocked" if the service is used in a particular manner. Users can encourage other users to access the service by sending electronic images to other users. In some embodiments, a user can be provided with additional electronic images to access a service based on use of that service by another user. Use of the service may include accessing the service with an electronic image received from the user. Access to the new features can be granted based on use of the service, thereby further encouraging users to use the service in hopes of obtaining additional electronic images. Use of different features of a service can enable a service management system to determine user preferences and feedback regarding features of the service. Such information can be useful to enable the service management system to determine changes in offerings of the service or to improvements to the service.

In some embodiments, an electronic image, when displayed, can indicate a status related to use of the access information to access a service. For example, an electronic image can include information indicating the status. When an electronic image including access information is displayed, the electronic image can indicate the status. The status can indicate a feature of a service that can be accessed using the electronic image. The status can indicate whether the electronic image has been used to access the service and if so, whether authorization was granted.

FIG. 1 shows a block diagram of communication system 100 according to an embodiment of the present invention. Communication system 100 can include messaging service 102, message management service 104, and online content management service 130 connected to network 106. Also connected to network 106 can be various clients 108, 110 that can be used to access messaging service 102, an online content management service 130, and/or message management service 104. In this example, client 108 accesses message management service 104 (as indicated by dashed arrow 112) while client 110 accesses messaging service 102 (as indicated by dashed arrow 114).

Online content management service 130 can include, for example, a file storage service, a file sharing service, a social media service that allows users to post messages and/or other content, and so on. Online content management service 130 can communicate with one or more data stores 134. Online content management service 130 can be hosted on servers maintained by a service provider and accessed via a network 106, such as the Internet. In some embodiments, online content management service 130 can store content in one or more data sources (e.g., a database). The content can include audio, video, data, electronic images (e.g., an electronic image including access information), files, email messages, and the like. In some embodiments, online content management service 130 can access message management service 104, or vice versa (as indicated by dashed arrow 136).

Messaging service 102 can be any service that allows users to send, receive, store, and/or access messages, where a "message" can include any electronic communication generated by a sender and directed to one or more recipients, such as email messages, instant messages (e.g., messages sent between users using various "chat" services), SMS/MMS messages (e.g., messages conforming to Short Messaging Service and/or Multimedia Messaging Service protocols supported by various cellular and other wireless data networks), voice messages, photo/image messages, social network messages, and so on. Examples of messaging service 102 can include email services such as Gmail™ (a service of Google Inc.) and Yahoo!® Mail (a service of Yahoo! Inc.). Other examples can include instant messaging or chat services such as Gmail's chat feature or Facebook's chat (a service of Facebook, Inc.), SMS/MMS services provided by cellular data carriers, social network services with a messaging component (e.g., social networks provided by Facebook, Inc., or LinkedIn Corp.). In some embodiments, a user can establish an account with messaging service 102, and messaging service 102 can store and provide access to user's messages 120. Messaging service 102 can also provide web-based client interfaces, dedicated application programs, application program interfaces (APIs), and/or other tools for facilitating user access to messages 120.

Message management service 104 can be a service that acts as a proxy or intermediary between messaging service 102 and one or more clients (e.g., client 108), as indicated by dashed arrow 116. Message management service 104 can provide enhanced functionality for organizing, storing, accessing, composing, and/or responding to messages 120 stored by messaging service 102. One example of message management service 104 can be the Mailbox service of Dropbox, Inc.

In some embodiments, access to a service, e.g., a service provided by message management service 104 or by online content management service 130, can be managed by access management system 140. Access management system 140 can include a computing system. Access management system 140 can be implemented using a combination of hardware, firmware, and/or software. Access management system 140 can implement one or more techniques described herein for managing access to a service. In some embodiments, all or part of an access management system can be implemented by the service, e.g., one or both of message management service 104 or online content management service 130.

Access to a service (e.g., message management service 104 or online content management service 130) can be managed through an account provided by the service. An account provided by the service can be associated with identification information corresponding to a user, a computing device (e.g., client 108 or client 110), an account provided by a messaging service (e.g., messaging service 102), and/or an account provided by a service (e.g., online content management service 130 or message management service 104). Access to a service can correspond with access to the service itself and/or one or more of the functions, features, methods, operations, options, or combinations thereof provided by service.

A client, e.g., client 108 or client 110, can be used to access a service. In some embodiments, access to a service can be provided at a client through an application (also referred to as an "app"). Access to a service can include access to download the app and/or install the app. For purposes of illustration, some embodiments are described herein to illustrate techniques for managing access to a service, such as message management service 104. However, such embodiments are not limited to management of a message management service and can be implemented to manage access to any type of service, such as online content management service 130.

In some embodiments, access management system 140 can implement enhanced functionality for managing access to a service, such as message management service 104. Access to a service can be implemented through use of an electronic image (e.g., a "coin" or a "token") including access information. As described further below, access management system 140 can produce an electronic image that includes access information. An electronic image, when displayed, can provide a visual representation of an object, a person, or a place. The electronic image can be based on data having a format, such as a bitmap, an icon, a picture, or the like. For example, an electronic image can be formatted according to a Joint Photographic Experts Group (JPG) standard, a graphics interchange format (GIF), a portable network graphics (PNG) standard, or another electronic image standard. In some embodiments, an electronic image can be a static image. In some embodiments, an electronic image can be an animated image (such as an animated GIF), video, a movie, or other dynamic image that changes appearance when displayed. The electronic image can indicate status corresponding to use of the access information. Examples of electronic images are described with reference to FIGS. 6 and 7.

The access information in an electronic image can include a value (e.g., a security key, a hash value, or some other security information), which upon verification, can grant an account a permission (e.g., a license or authorization) to access a service and/or to access one or more of the following provided by a service: a function, a feature, an operation, an option, a method, or combinations thereof. When a user requests access to a service based on the electronic image (e.g., request to redeem a coin), access management system 140 can determine (e.g., verify) access to the service for the user requesting access based on the access information in the electronic image. In other words, an electronic image can be used to regulate (e.g., license) access to a service based on the right(s) granted to an account associated with a user requesting access using the electronic image. In some embodiments, access to a service can be limited to an account that is given an electronic image with access information, which can be used to obtain permission to access the service. A permission to access a service can be linked to an account provided by the service or a device associated with a user. An electronic image can be considered as used (e.g., redeemed) when access to the service is granted for a request using the electronic image.

In some embodiments, electronic images can be used to control access to a group of users. For example, electronic images can be used to limit access to a service and/or its features or functions as part of an early or targeted release (e.g., a beta release). In such embodiments, electronic images (which can be referred to as a "beta electronic image", a "beta coin", or similar) can be implemented such that it can enable message management service 104 to control access to its service with respect to a particular group of users. For example, access to a service through use of an electronic image can be restricted based on one or more criteria related to use of the electronic image or use of the service by one or more users. A criterion related to access of a service can be based on use of the service or use of one or more features or functions of the service. For example, an electronic image can be given to users based on their use of a feature of the service for a certain amount of time. In this example, the electronic image, when redeemed, can enable its holder to obtain access to the service for an extended period of time. Alternatively or additionally, the electronic image can enable a user to access an additional feature or a function of the service. More examples of management of access using an electronic image are described below.

An electronic image can be sent to one or more users. An electronic image can be used, e.g., redeemed, to obtain access to the service and/or one or more functions or features of the service permitted to be accessed based on the electronic image. In some embodiments, an electronic image can grant permission to a single user to access a service using the electronic image. While an electronic image can grant permission to a threshold number of users (e.g., a single user) that redeem the electronic image, the electronic image can be distributed to more than the threshold number of users permitted to access the service using the electronic image. Some users might not gain access to the service if the threshold number of users permitted to access the service has been reached using the electronic image. Therefore, in the case of an electronic image that was redeemed to permit a user to access a service, subsequent users that request to redeem the electronic image can be denied access to the service when a condition (e.g., a threshold number of users) related to use of the electronic image is satisfied. In some embodiments, an electronic image can be communicated to multiple users by sending a message including the generated electronic image to each user. In some embodiments, the message can include all or part of the electronic image such as the access information. The electronic image can be distributed in a message using a messaging service. Examples of distribution of an electronic image in a message are described below with reference to FIGS. 8-10.

In some embodiments, access management system 140 can generate an electronic image that, when rendered, can have an appearance (e.g., a color or a style), can be animated, can be associated with a sound that is audible when the image is displayed, or combinations thereof. An electronic image can be generated to be displayed accordingly with the status of access granted based on the access information in the image. In some embodiments, an electronic image can include status information indicating a usage status of the access information to access a service. For example, a change in status can include a loss of access or use of the electronic image to access the service. The usage status of the access information can be determined based on the status information. The electronic image can be rendered based on the status determined from the status information. The display of an electronic image can be adjusted corresponding to a change in status corresponding to use of the access information. In some embodiments, an electronic image can be displayed differently to reflect a change in usage status of the access information. For example, an electronic image can display a status that indicates whether the access information of the electronic image has previously been used to access a service. In another example, an electronic image can be generated such that its appearance can change to indicate that the electronic image has already been used to access a service and/or to indicate whether the electronic image can be used again to access the service.

In some embodiments, an electronic image can be displayed to indicate a measure of its use to access a service. In some embodiments, an electronic image, when displayed, can visually present information, such as information indicating a type of permission granted for use of the electronic image and/or information identifying the electronic image (e.g., an electronic image number). The information identifying the electronic image can be associated with a user account.

Access management system 140 can manage access to a service based on one or more criteria (e.g., a condition, a rule, or an event). In some embodiments, access to a service by an account can be granted based on access information in an electronic image can include access to one or more of functions, features, operations, options, or combinations thereof of a service. For example, permission to access a service can include the ability to install an app that facilitates access to a service. In some embodiments, access to a service can be based on a date when access is requested, a time when access is requested, use of a service (e.g., message management service 104 or online content management service 130) by an account, occurrence of an action performed using a service (e.g., message management service 200 or online content management service 130), an event occurring in a service (e.g., message management service 200 or online content management service 130), satisfaction of a condition related to use of a service by a user, or combinations thereof. For example, a permission to access a feature of a service (e.g., message management service 200 or online content management service 130) can be granted to an account when a certain number of emails have been sent through the service for the account. In some embodiments, access to a service can be based on actions of a group of users collectively.

Access management system 140 can determine permission to access a service, e.g., message management service 104 or online content management service 130. Access management system 140 can manage data (e.g., access management data) using one or more data structures (e.g., data structures described with reference to FIGS. 4 and 5) to determine access to the service. The data can include one or more values (e.g., a security key) that are included in access information. A security key can include a random value generated based on a hash operation. The data storing the security key can be used to determine authorization for an account to access a service using the security key. The data stored by access management system 140 can indicate one or more rights granted to a user of the access information. Techniques for managing and verifying access information (e.g., a security key) are described further below.

An electronic image can be received (e.g., in a message) by a user operating a client. The electronic image can be redeemed by a user through a client. A presentation of the electronic image in a message, such as an email message, can indicate a status associated with the electronic image and other information (e.g., a right that is permitted by the service through use of the electronic image). An electronic image can be redeemed by a user through interaction with the electronic image using an interface at the client device (e.g., an interface in an app at the client device). Techniques are described below for requesting, from a client, access to the service based on electronic image. Examples of use of an electronic image to request access to a service are described below with reference to FIGS. 14-16.

As explained above, access to a service can be determined based on satisfaction of one or more criteria associated with access information in an electronic image. In some embodiments, the criteria associated with access to a service might not be known by users of the service. By limiting or enabling access to a service based on use of the service, users can be encouraged to use message management service 104 more frequently. In cases where access to a new service or feature is being released (e.g., a beta release), implementing techniques described herein for permitting access to a service based on use of the service can encourage users to access the new service or feature more frequently. In some embodiments, a criterion can be defined based on type of actions, such as a user practice (e.g., maintaining an empty message inbox or removing all spam messages), specific use of the service, or other types of actions. Such criterion can be defined to encourage users to use message management service 104 more often. Access management system 140 can provide users with additional electronic images that include access information to use one or more new or different features of message management services, which were previously unavailable. In doing so, new features can be "unlocked" if message management service 104 is used in a particular manner. Users can encourage other users to access the service by disseminating (e.g., sharing) electronic images to other users. In some embodiments, users can be granted additional electronic images to access a service based on other users that access the service with the disseminated electronic images and/or use of the service by users that receive the electronic images. Access to the new features can be granted as a surprise based on use of the service, thereby further encouraging users to use the service in hopes of obtaining additional electronic images.

Figure 2:
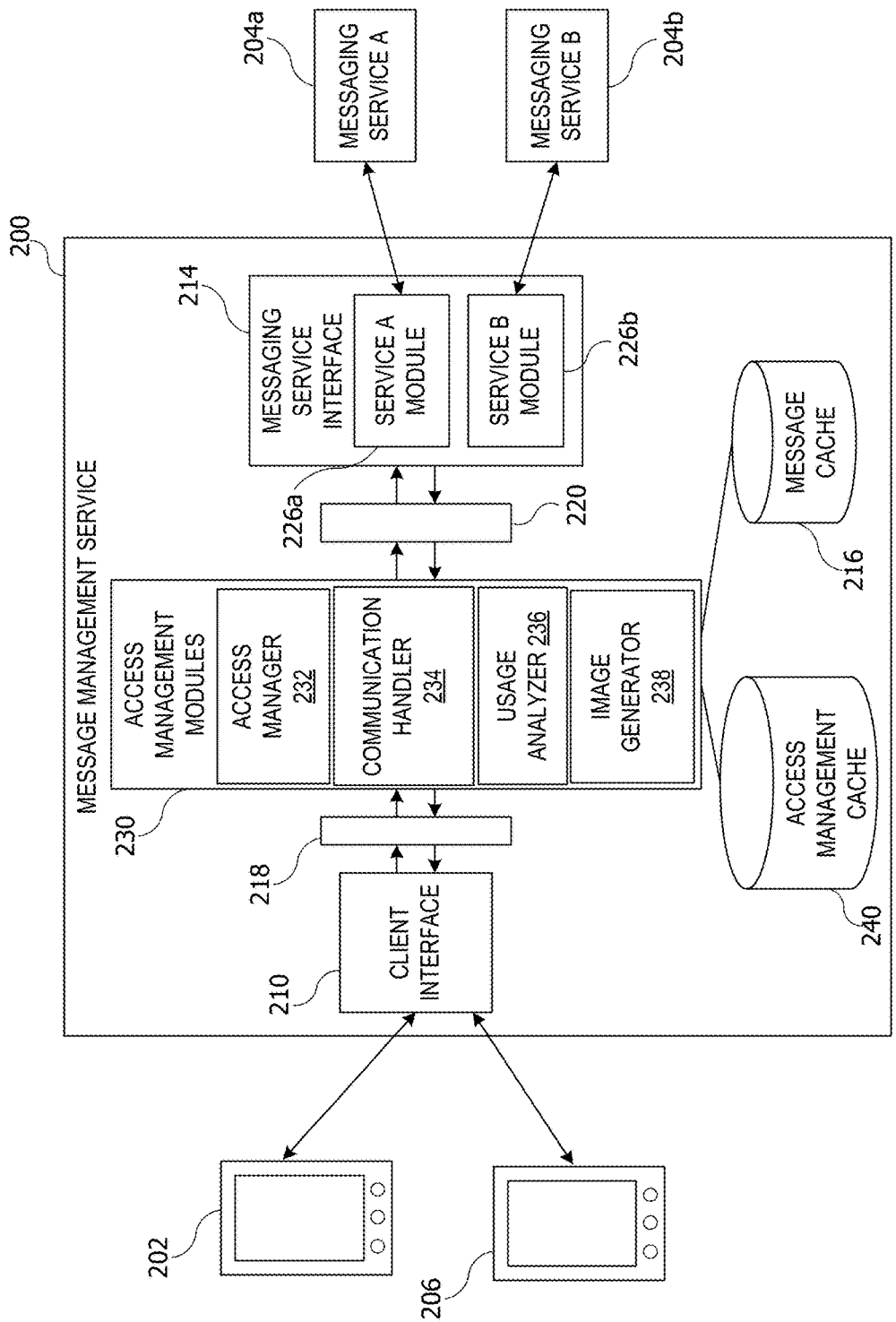
FIG. 2 shows a block diagram of a message management service according to an embodiment of the present invention.

FIG. 2 shows a block diagram of a message management service 200 according to an embodiment of the present invention. For purposes of illustration, some embodiments of managing access to a message management service are described; however, such embodiments can be implemented for other services, such as an online content management service, e.g., online content management service 130. In some embodiments, an access management system that can manage access to a service can be implemented by a message management service or an online content management service, or both. In the examples described with reference to FIG. 2, message management service 200 can implement an access management system, e.g., access management system 140.

In some embodiments, message management service 200 can implement message management service 104 of FIG. 1. For example, message management service 200 can act as an intermediary between one or more clients, such as client 202 (e.g., implementing client 108) and client 206 (e.g., client 110 of FIG. 1), and various messaging services 204a, 204b (e.g., implementing messaging service 102) of FIG. 1. Each service 204a, 204b can be a different messaging service, such as different email services, an email service and a social network service, and so on. While two messaging services 204 are shown, any number of messaging services 204 can be supported by a single message management service 200.

Message management service 200 can include client interface 210, message management modules 230, messaging service interface 214, message cache 216, and access management cache 240. Client transfer layer 218 can provide transfer queues for transferring messages and other instructions and information between client interface 210 and access management modules 230, and service transfer layer 220 can provide transfer queues for transferring messages and other instructions and information between access management modules 230 and messaging service interface 214. Message management service 200 can implement an access management system through implementation of access management modules 230.

Client interface 210 can communicate with multiple instances of client 202 (e.g., clients associated with different users and/or multiple clients associated with the same user). For instance, client interface 210 can deliver "inbound" messages from messaging services 204a, 204b to client 202, receive "outbound" messages from client 202, and/or receive various message processing instructions from client 202, such as instructions to defer a message.

Message management service 200 can include functional blocks or modules configured to perform various operations on messages received by message management service 200, including outbound messages received from client 202 as well as inbound messages received from messaging services 204a, 204b. Access management modules 230 can be configured to perform one or more operations to manage access to a service, e.g., message management service 200. For example, access management modules 230 can include image generator 238, access manager 232, access manager 232, communication handler 234, and usage analyzer 236.

Messaging service interface 214 can include various service modules 226a, 226b, each of which can be configured to communicate with a different one of messaging services 204a, 204b. For example, different messaging services 204 can support different communication protocols for access by external clients (e.g., IMAP, POP, MAPI/Exchange, custom APIs, and so on), and each service module 226 can be configured to use the appropriate protocol for a particular messaging service 204.

In some embodiments, messaging service interface 214 can present itself to messaging services 204a, 204b as a client accessing functionality of messaging services 204a, 204b, so that the existence of message management service 200 can be transparent to messaging services 204a, 204b. For example, if messaging service 204a supports IMAP, service module 226a can establish a persistent IMAP connection to a user's account with messaging service 204a, allowing messaging service 204a to deliver any incoming messages it receives for the user's account to message management service 200. Persistent connections to other services than IMAP can also be maintained, or messaging service interface 214 can periodically poll messaging services 204 to obtain new messages. The persistent connection can be maintained regardless of whether the user currently has any client 202 connected to client interface 210, and message management service 200 can maintain synchronization with messaging services 204.

Message cache 216 can be a database or other data store that provides storage and retrieval of messages. For example, messages can be stored and retrieved by reference to message identifiers (message IDs) assigned to each message by message management service 200 and/or messaging services 204. Message management service 200 can use message cache 216 to store copies of messages that are likely to be of interest to a client, such as recently received messages or messages found in a user-initiated search. Messaging services 204 can maintain their own message stores independently of any action by message management service 200. In some embodiments, messaging service 204 can maintain a primary store of messages for a user that can include all messages currently associated with that user's account (e.g., including sent messages, received messages, archived messages, etc.), and message cache 216 can store a subset of the user's messages as well as information about additional messages in the primary store. If client 202 requests a message that is not presently stored in message cache 216, message management service 200 can retrieve the message from the appropriate messaging service 204 and deliver it to client 202.

Access management cache 240 can be a database or other data store that provides storage and retrieval of access information, electronic images, other information for managing access to message management service 200, or combinations thereof. Message management service 200 can use access management cache 240 to store electronic images and/or access information. In some embodiments, access information can be managed in access management cache 240 using hierarchical storage techniques (e.g., a hierarchical data structure). Examples of data stored in access management cache 240 are described with reference to FIGS. 4 and 5. In some embodiments, access management cache 240 can be distinct from message cache 216, which can be used to store messages for a user including all or some messages currently associated with a user's account (e.g., including sent messages, received messages, archived messages, etc.).

In operation, message management service 200 can obtain inbound messages from messaging services 204 and provide the messages to client 202. Message management service 200 can also receive outbound messages (e.g., messages to be sent) from client 202 and provide the messages to messaging service 204 for delivery to the recipient(s). Message management service 200 can perform various operations on inbound and/or outbound messages.

In some embodiments, access management modules 230 can manage access to its services from a client, e.g., client 202 or client 206. For example, access manager 232 can control access to message management service 200. Access manager 232 can determine access information (e.g., a security key) for enabling access to message management service 200 or one or more of its functions, features, operations, methods, or combinations thereof. Access information can be a unique value corresponding to a security that is generated by performing one or more techniques for generating access information. In some embodiments, the security key can be derived using a security key (e.g., a master security key) for accessing message management service 200. The derived security key can be generated based on the security key. A security key can be generated using a random number. The random number can be a value produced by a hash operation. In some embodiments, access information can include a universally unique identifier (QUID).

In some embodiments, access manager 232 can store access information in association with an account. The account can be provided by a service, e.g., message management service 200 or messaging service 204. Access information can be stored in association with an account that has been permitted access to a service using the access information. Information stored by access manager 232 can be stored in access management cache 240. Information used to generate access information, e.g., a security key, can be stored in access management cache 240. In some embodiments, access information can be stored in access management cache 240 in association with an account. Access information can be stored in association with an account that is permitted access to message management service 200 using the access information. Access information can be stored in association with an account that is denied access to message management service 200 using the access information. Examples of techniques for generating and/or storing access information are described below with reference to FIGS. 4 and 5.

Access manager 232 can determine (e.g., verify) whether an account has authorization to access message management service 200. Access manager 232 can use access information received in a request from a client to determine authorization of an account. The access information can be extracted from the electronic image and processed to determine authorization. In some embodiments, access manager 232 can store information in access management cache 240 indicating authorization of an account to access message management service 200. Such information can include information indicating a type of access to message management service 200, such as a feature or a function of a service that can be accessed by the account. Examples of determining authorization are described below and further described with reference to FIGS. 4 and 5.

In some embodiments, authorization to access message management service 200 can be determined by performing an operation to lookup the access information in memory, e.g., access management cache 240. Access management cache 240 can be searched to determine whether the access information was generated by message management service 200. Access can be denied if the access information was not generated by message management service 200 (e.g., the access information cannot be found). If the access information is found, authorization can be determined based on whether access has been granted using the access information. The operation to lookup the access information can include determining whether the access information is associated with an account, e.g., an account provided by message management service 200, or another service, e.g., online content management service 130. Authorization can be granted when the access information is not associated with an account. In some embodiments, the access information can be used to grant access to multiple accounts. In such embodiments, authorization can be granted if the access information is not associated with the threshold number of accounts permitted access using the access information In some embodiments, access information can be verified by performing a checksum operation. For example, a checksum operation can be performed in a manner as the security key could have been generated, e.g., using access information that is related to the access information to be verified. Associated with an account can indicate access has previously been granted based on the access information.

In some embodiments, access manager 232 can determine whether to grant authorization to an account to access to a service and/or a feature of the service based on determining whether one or more criteria related to access information (e.g., a particular security key) have been satisfied. For example, a criterion can correspond to a threshold number of accounts that can be granted access to message management service 200 with particular access information. In some embodiments, a criterion can be defined based on multiple events. The multiple events can correspond to actions performed by multiple users having access to a service. For example, when a certain number of users have performed a certain action (e.g., sent a certain number of email messages), each user of the users that satisfied that criterion can receive access to a feature of the service.

In some embodiments, access manager 232 can configure access information stored in access management cache 240. Access granted to an account can be configured to provide additional access to message management service 200 or to restrict access to message management service 200. Access information associated with an account can be adjusted based on configuration of access for the account. Access for an account can be adjusted based on one or more criteria for accessing a service, e.g., message management service 200. The criteria can be stored in access management cache 240 in association with an account.

In some embodiments, a criterion associated with access information can be defined based on one or more events, actions, conditions, or combinations thereof, which can occur during operation of a service, e.g., message management service 200, for which access is controlled by access management modules 230. In some embodiments, the criterion can correspond to an action performed with respect to an account provided by a service and/or can correspond to a state associated with the account. Satisfaction of the criterion can enable a user requesting access based on the access information to obtain access to the service and/or feature to which permission is granted for the access information. In some embodiments, a criterion for accessing message management service 200 can be based on behavior and/or operations performed by a user. Such behavior and/or operations can include, without restriction, those described herein, such as sharing access information, use of a service, or combinations thereof.

Access manager 232 can determine whether to revoke or grant access to an account provided by message management service 200 based on whether the operations and/or behavior satisfy criteria related to access information. In some embodiments, a criterion can be based on a condition corresponding to a user's account. For example, a criterion can be based on a count of messages in a folder of an account (e.g., zero messages in an inbox folder). In another example, a criterion can be based on a period for having a certain number of messages in a folder of an account. In some embodiments, a criterion can be based on a condition related to use of a function of a service (e.g., configuring a rule for a command or use of an archive command). In some embodiments, a criterion can be based on an event related to multiple accounts. For example, a criterion can be based on occurrence of a user redeeming an electronic image shared by another user. In some embodiments, a criterion can be based on a status of an account, e.g., an account that reaches a certain user status, or a status based on user of a service.

In some embodiments, access to message management service 200 can be restricted based on one or more criteria, such as the number of accounts or the number of devices that can access message management service 200 using an account. In some embodiments, a criterion can be based on actions corresponding to multiple accounts.

In some embodiments, access to message management service 200 can be granted to additional users that are on a waitlist. The additional access can be generated based on behavior of an existing account that has been granted access to message management service 200. Access manager 232 can obtain information from access management cache 240, which stores data indicating analysis of behavior and/or operations performed corresponding to use of message management service 200 by one or more accounts. The data indicating such analysis can be determined by usage analyzer 236 described further below.

Image generator 238 can generate an electronic image (e.g., a coin or a token), which can be used to request access to message management service 200. The electronic image can be generated with access information. The access information can be determined by access manager 232. The access information can be used to obtain access to message management service 200. Image generator 238 can include access information into data of an electronic image. For example, access information can be inserted into metadata (e.g., a comment field) of an electronic image.

An electronic image can be generated to present an appearance of a person, an object, and/or a place. A presentation of the electronic image can indicate a status corresponding to use of the electronic image to access to message management service 200 based on the access information included in the image. The use of the access information can correspond to use of the access information to access to message management service 200. Examples of an electronic image are described with reference to FIGS. 6 and 7.

In some embodiments, an electronic image can be interactive such that interaction with the electronic image in a graphical interface can cause a request to be sent to message management service 200 to request access to message management service 200. Examples of use of an electronic image are described below with reference to FIGS. 14-16.

In some embodiments, image generator 238 can generate an electronic image (e.g., an additional electronic image) with access information to enable additional users to access message management service 200. Additional electronic images can be provided to existing users to share with others (e.g., users without access to the service) to encourage new users to use message management service 200. Additional electronic images can be generated, on demand, to enable more users to access message management service 200.

Communication handler 234 can manage communication with clients, e.g., client 202 or client 206 to enable access to message management service 200. In some embodiments, communication handler 234 can send data to a client, e.g., client 202. The data can include an electronic image and/or access information. The data can be presented by the client in an interface of the client. The data can be presented with an account associated with a user of the client.

In some embodiments, communication handler 234 can be sent in a message directed to a user. The user can be associated with a client from which a request was received to access message management service 200. A message can be sent via one or more messaging services 204 to a user to provide an electronic image. The message can include an electronic image. Examples of a message with an electronic image are described with reference to FIGS. 8-10.

In some embodiments, communication handler 234 can send a request to one of messaging services 204 to instruct messaging service 204 to send a message (e.g., an email message) to a user. In another example, communication handler 234 can instruct messaging services 204 to send an SMS message including the access information to a user. The request can instruct messaging services 204 to send a message to an account (e.g., email account) associated with a user. The request can include information identifying a user by a messaging account provided by messaging service 204. The information identifying the user can be obtained from the account. In some embodiments, communication handler 234 can send a message from an account of message management service 200 to an account provided by messaging services 204. In some embodiments, communication handler 234 can request messaging services 204 to send a message to a user notifying the user that an electronic image has been associated with the user's account. In some embodiments, a message can be sent that includes an address or information identifying a location where an electronic image can be viewed and/or accessed. For example, a message can include a link to a location in access management cache 240 where an electronic image is stored.

Communication handler 234 can receive, from a client, requests to access one or more services, e.g., message management service 200. A request can include access information or an electronic image that includes access information. A request with access information can be processed by access manager 232 to determine whether an account associated with client has authorization to access message management service 200 based on the access information.

In some embodiments, communication handler 234 can send data to a client to indicate authorization of an account to access message management service 200. The authorization can be determined based on access information received from the client. The data can include authorization information indicating the authorization of an account to access message manage service 200. In instances when authorization of an account to access message management service 200 is denied, data sent to client can indicate that access by the account is denied.

Usage analyzer 236 can determine analytical data based on operations performed using message management service 200 or operations performed by message management service 200. The analytical data can be stored in access management cache 240. The analytical data can indicate statistical information about operations performed by message management service 200 for an account. Such operations can include, without restriction, those described herein, such as sharing access information, performing message management actions, or combinations thereof. The analytical data can include information indicating use of access information to access message management service 200. The analytical data can be used by access verifier 232 to assess whether one or more criteria for access have been satisfied to determine authorization for an account to access message management service 200.

It will be appreciated that message management service 200 is illustrative and that variations and modifications are possible. For example, other message management modules and/or operations can be provided. In some embodiments, message management can include windowing (selecting and immediately delivering to a client a fixed number of messages deemed likely to be relevant, such as the 50 or 100 or some other number of most recent messages), backfilling (populating message cache 216 with messages in anticipation of client requests), message format conversion (e.g., converting between a message format used by a messaging service and a format optimized for display on a client), management of message folders or streams, message sorting, management of drafts of electronic documents, management of attachments, synchronization with messaging services 204 (e.g., relaying instructions from client 202 to move or modify messages) and so on.

Figure 3:
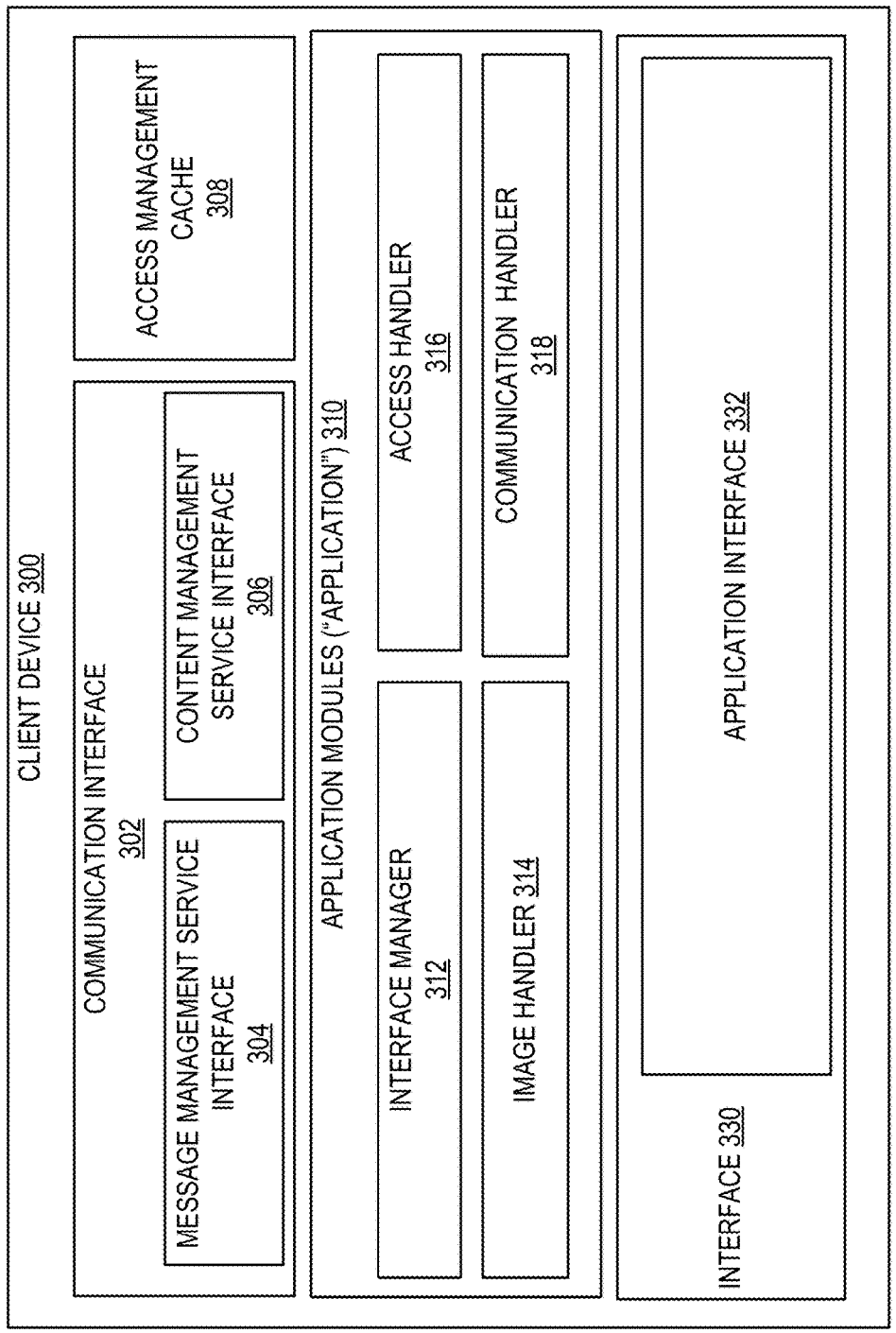
FIG. 3 shows a block diagram of a client device according to an embodiment of the present invention.

FIG. 3 shows a block diagram of client device 300 according to an embodiment of the present invention. Client device 300 can implement any of client devices 108, 110 of FIG. 1 or client devices 202, 206 of FIG. 2. Client device 300 can be a user-operated computing device that can be implemented using hardware, firmware, software, or combinations thereof to interact with online content management service 130, message management service 104, and/or messaging service 102. Examples of client device 300 can include, without limitation, a desktop computer, a laptop computer, a tablet computer, a smart phone, a wearable computing device, a personal digital assistant, and so on. Client device 300 can include interface 330. Interface 330 can include a physical interface, a graphical interface (e.g., a graphical user interface), or a combination thereof.

In some embodiments, client device 300 can provide access to application 310 ("app"). App 310 can enable a user to access and perform enhanced functions provided by one or more management services, e.g., message management service 200 or online content management service 130. For example, app 310 can be customized to allow access to enhanced functions such as managing access to a service. App 310 can be accessed via interface 330 of client device 300. In some embodiments, interface 330 can include or implement application interface 332 (e.g., a graphical interface), which enables operation of app 310.

In some embodiments, application interface 332 can enable a user operate app 310 to perform one or more actions to access a service, e.g., message management service 200. When client device 300 receives a request via application interface 332 to perform one or more actions to manage access to a service, app 310 can process the request to perform the action(s). An action can include client device 300 communicating appropriate instructions to an access management system (e.g., access management system 140). In some embodiments, application interface 332 can enable a user to access a service using one or more electronic images. Application interface 332 can be displayed for app 310. Examples of application interfaces (e.g., application interface 332) implemented for app 310 are described below with reference to FIGS. 8-16.

Client device 300 can implement communication interface 302 that includes functional blocks or modules, each of which can be configured to handle communications for client device 300, e.g., communications different types of management services and/or an access management system (e.g., access management system 140). In some embodiments, communication interface 302 can implement other interfaces, such as a network interface, web interface, or other remote communication interface, to enable app 310 to communicate with a management service or an access management system. For example, communication interface can include content management service interface 306 and/or message management service interface 304. Each interface 304, 306 can be configured to use an appropriate protocol for communication with a type of management service. Message management service interface 304 can be configured to communicate with a message management service, e.g., message management service 200. Content management service interface 306 can be configured to communicate with a content management service, e.g., online content management service 130. In some embodiments, communication interface 302 can be implemented by app 310 to communicate with a management service.

App 310 can be implemented by one or more application modules. In some embodiments, all or part of the modules of app 310 can be stored and executed locally on client device 300 to operate app 310. For example, all or part of the modules of app 310 can be installed with client device 300 or can be stored after receipt from a computing system, e.g., message management service 200, accessible to client device 300. In some embodiments, all or part of the modules of app 310 can be hosted and executed remotely on a computing system, e.g., message management service 200 or access management system 140, accessible to client device 300. A computing system such as message management service 200 can be accessible via communication interface 302. For its operation, app 310 can communicate with an access management system 140 or a management service, e.g., message management service 104 and/or online content management service 130, which implements an access management system. In some embodiments, app 310 can be, for example, implemented as a client app executing on an operating system of client device 300, a web browser that interfaces with a web-based messaging service, a service-specific application provided by the provider of messaging service 102 or the provider of message management service 104, or another app. For example, app 310 can be implemented by a provider of message management service 104 or online content management service 130, and accessed from client device 300 via application interface 332.

In some embodiments, app 310 can by implemented by functional blocks or modules including interface manager 312, image handler 314, access handler 316, and communication handler 318. Client device 300 can include access management cache 308 to store information for managing access to a service.

Access management cache 308 can be a database or other data store that provides storage and retrieval of access information, electronic images, and other information for managing access to a management service. Client device 300 can use access management cache 308 to store electronic images and/or access information that is received by client 300 device. Information stored in access management cache 308 can be associated with an account provided by a service and/or a messaging account provided by a messaging service.

When client device 300 receives a request via the application interface 332 to perform one or more actions to access a service, client device 300 can process the request to perform the action(s). An action can include client device 300 communicating appropriate instructions such as a request including an electronic image to access a service, e.g., message management service 104 and/or online content management service 130.

Communication handler 318 can manage communication with an access management system, a service, such as message management service 200 or online content management service 130 of FIG. 1, and/or one or more messaging services 204. Communication handler 244 can receive messages for a messaging account provided by messaging service 204. The messages can be received from messaging service 204 or via message management service 200. The messages received from message management service 200 can be associated with an account provided by message management service 200. A message can include an electronic image and/or access information that can be used to access message management service 200.

In some embodiments, communication handler 318 can receive information to display in application interface 332, such as information for an app, which facilitates access to message management service 200. Communication handler 318 can send a request to access a service based on interaction with application interface 332. For example, when a user interacts with an electronic image in application interface 332, communication handler 318 can send a request to message management service 200 including the electronic image and/or the access information in the electronic image.

Interface manager 312 can generate information to be displayed in application interface 332, such as examples of application interface 332 described herein. For example, interface manager 312 can generate a graphical interface to be displayed application interface 332. Application interface 332 can display a message received from message management service 200 or from messaging services 204. Examples of a message displayed in application interface 332 are described with reference to FIGS. 8-10.

Figure 16:
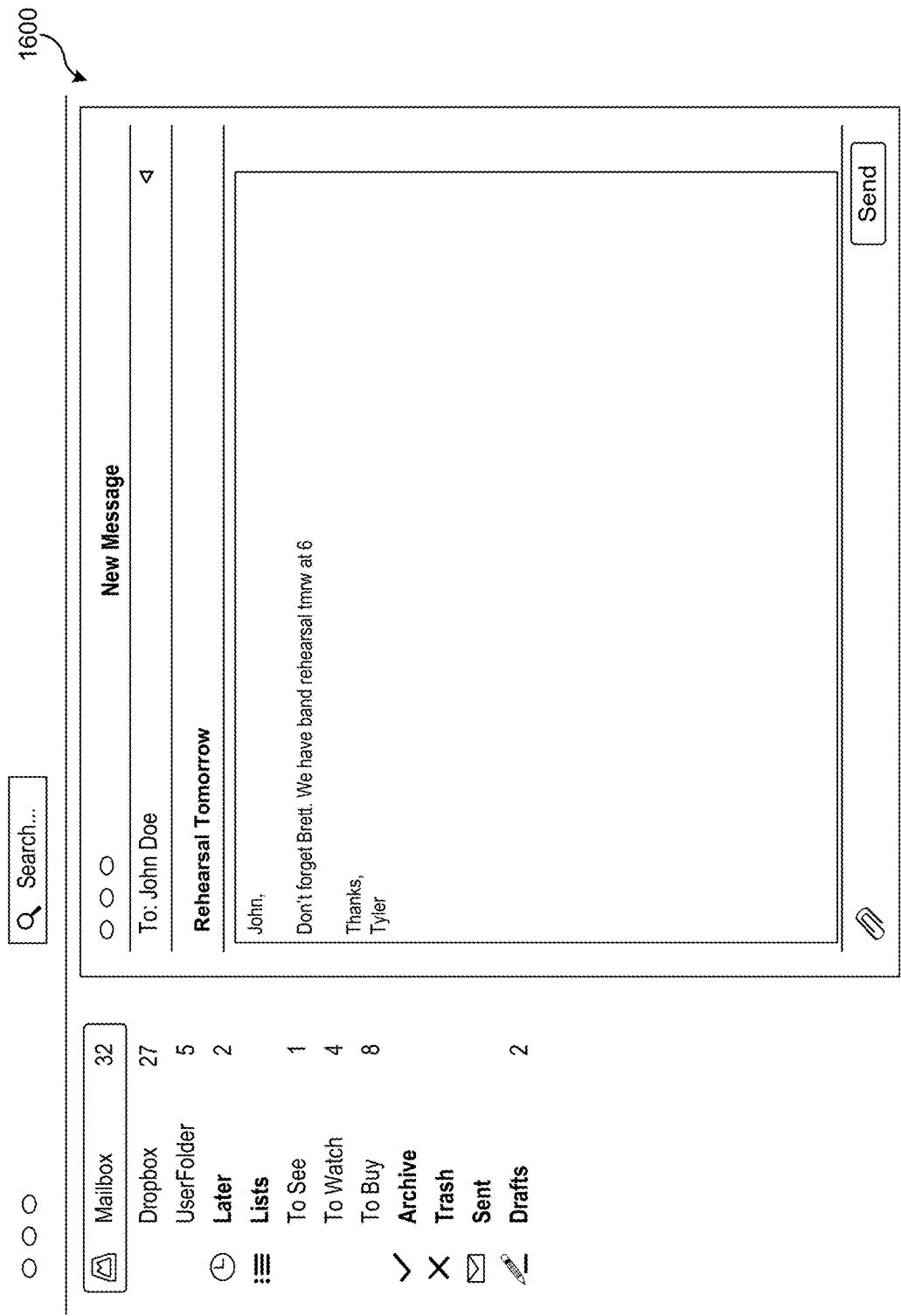
FIG. 16 shows an example of an interface of a message management service according to an embodiment of the present invention.

Interface manager 312 can generate application interface 332 to display one or more interfaces of an app 310, e.g., an app for message management service 200 shown in FIG. 16. Application interface 332 can be generated based on information received from message management service 200.

In some embodiments, application interface 332 can display an electronic image including access information. An electronic image can be displayed as part of a message. Application interface 332 can present one or more interfaces to access a service. In some embodiments, an electronic image can be displayed in application interface 332 (e.g., an interface displayed for an email application).

In some embodiments, application interface 332 can enable a user to interact (e.g., drag) with an electronic image. Examples of interactions with an interface presented by a client device are described with reference to FIGS. 14 and 15. The electronic image can be received in a message from message management service 200. Interface manager 312 can process input received from interaction in application interface 332 to determine one or more actions to perform. Interface manager 312 can process the input to determine a request from a user, such as a request to access message management service 200 using an electronic image. Input received via application interface 332 can be processed to determine input from a user, such as input corresponding to an electronic image. The input can be processed to identify an electronic image by which interaction occurred.

Interface manager 312 can display information received from message management service 200, such as authorization information indicating authorization of a user to access message management service 200. Application interface 332 can be adjusted or updated to display an interface (e.g., interface shown in FIG. 16) for accessing message management service 200 based on authorization. Such an interface can be provided to enable access to message management service 200 upon a grant of authorization to an account. Interface manager 312 can present additional interfaces that enable access to message management service 200 based on the authorization. In some embodiments, additional interfaces can be presented in application interface 332 to provide a feature of the service.

Image hander 316 can perform processing for an electronic image. For example, image handler 316 can process a message to obtain an electronic image from a message, such as when a user interacts with the electronic image.

Information from an electronic image can be processed to extract information from the electronic image, such as access information and/or a status related to use of the electronic image.

Access handler 314 can request communication handler 318 to communicate a request to message management service 200 to request access based on an electronic image. Access handler 318 can process authorization information received from a service or an access management system and can accordingly instruct interface manager 312 to present application interface 332 to indicate authorization to access a service. Based on the authorization, access handler 318 can instruct interface manager 312 to present application interface 332. Interface manager 312 can generate application interface 332 for app 310 to enable access to a service based on the authorization.

In some embodiments, application interface 332 can provide information about access to a service provided to an account. Information about an account can include information identifying one or more electronic images (e.g., coins) associated with the account. For example, application interface 332 can display an image (e.g., a wallet) that displays the electronic image(s) associated with an account. The electronic images can include received electronic images, redeemed electronic images, and/or electronic images shared with other accounts. Each electronic image can be displayed with or can indicate a status related to use or redemption of the electronic image.

In some embodiments, interface manager 312 can generate application interface 332 to provide information about a usage status corresponding to the electronic images. For example, application interface 332 can provide information indicating a service that is accessible from the account based on one or more electronic images. The information can indicate a type of access to a service accessible to the account. The information can indicate one or more electronic images redeemed corresponding to the type of access to the service. In some embodiments, application interface 332 can provide information indicating criteria for obtaining additional electronic images and a feature that can be accessed based on satisfaction of the criteria. In some embodiments, one or more electronic images can be displayed in association with the criteria.

In some embodiments, application interface 332 can display information related to electronic images used or associated with one or more accounts of a service. For example, application interface 332 can display information about a status of electronic images redeemed by multiple accounts. The information can display a status related to acquiring electronic images or related to redemption of electronic images. In some embodiments, the information can be displayed based on one or more categories related to electronic images. For example, one category can indicate access to a feature of a service granted to users based on the electronic image(s). In another example, one category can indicate a number of electronic images received by users. The information displayed by application interface 332 can indicate ranking information that indicates rankings related to electronic images. For example, application interface 332 can indicate a ranking between accounts based receipt of electronic images, sharing electronic images, and/or redemption of electronic images.

In certain embodiments, interface manager 312 can provide application interface 332 can display information indicating one or more criteria that were satisfied for receiving an electronic image. For example, application interface 332 can display information indicating a history of one or more electronic images. For example, the history can indicate when and/or how an electronic image was received, redeemed, and/or shared. In some embodiments, application interface 332 can provide information indicating a relationship of electronic images, such as an account from which an electronic image can have been received, shared, or redeemed.

Figure 4:
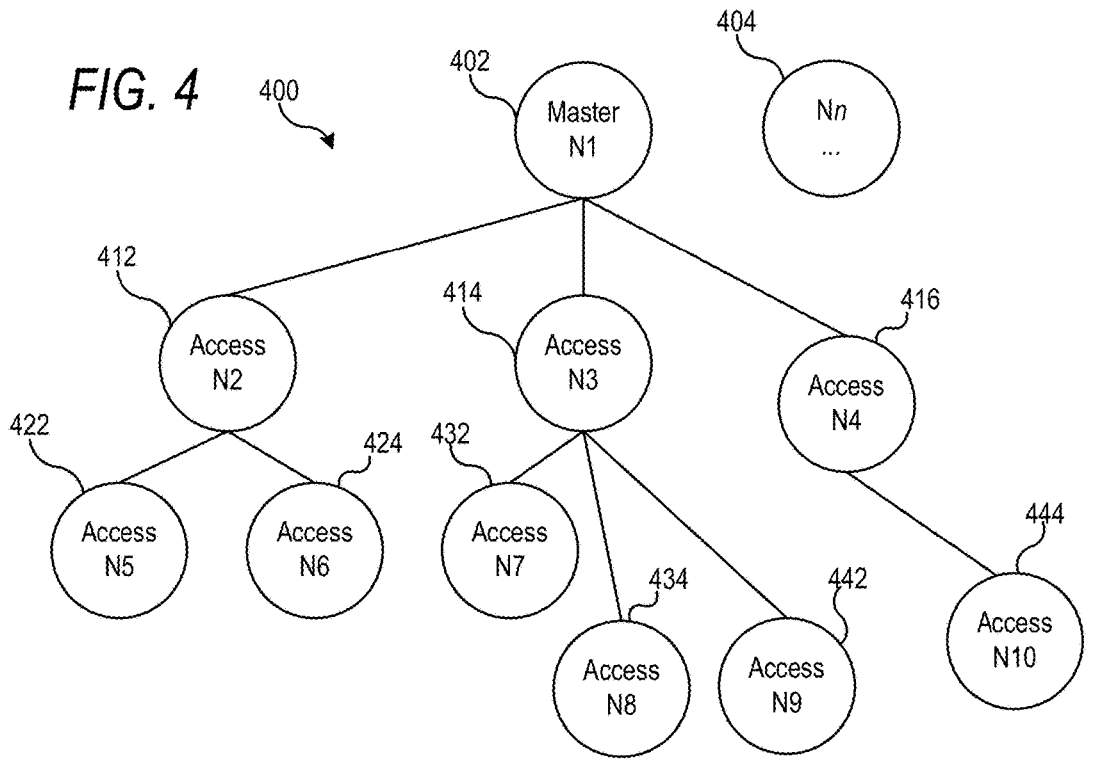
FIG. 4 shows an example of a data structure for managing access to a service management system according to an embodiment of the present invention.
Figure 5:
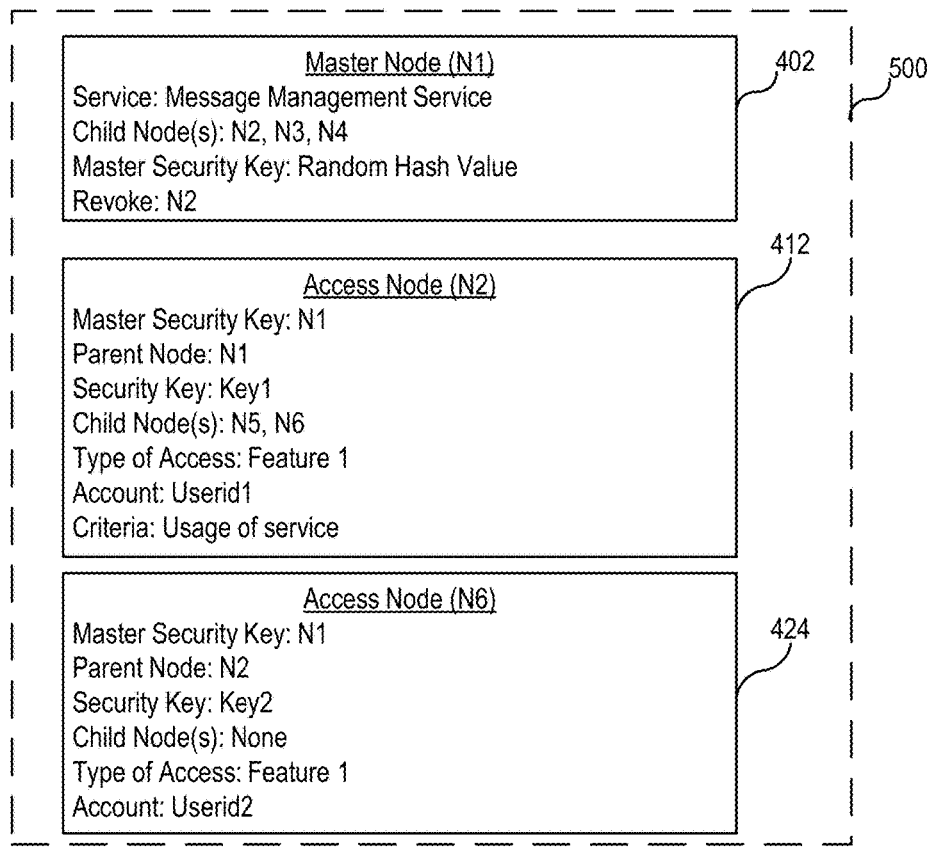
FIG. 5 shows examples of data for managing access to a service management system according to an embodiment of the present invention.

FIG. 4 shows an example of data structure 400 for managing access to a service management system according to an embodiment of the present invention. FIG. 5 shows an example of data 500 for managing access to a service provided by a service management system according to an embodiment of the present invention. In certain embodiments, data structure 400 can be organized as a hierarchical data structure, such as tree data structure. Data structure 400 can be implemented using one or more types of data structures including, without restriction, a linked list, an array, a hashtable, a map, a record, a graph, or other type of data structure. In some embodiments, data structure 400 can be organized differently from a manner in which data structure 400 is illustrated and/or described herein with reference to FIG. 4. Data structure 400 and data 500 can be managed in storage (e.g., access management cache 240 of FIG. 2) accessible to message management service 200. Data structures described with reference to FIGS. 4 and 5 can be implemented by an access management system, e.g., an access management system 140.

Data structure 400 can include a plurality of data structures, each data structure referred to herein as "a node." For example, data structure 400 can include node 1 (N1) 402, node 2 (N2), 412, node 4 (N3) 414, node 4 (N4) 416, node 5 (N5) 422, node 6 (N6) 424, node 7 (N7) 432, node 8 (N8) 434, node 9 (N9) 442, node 10 (N10) 444, and node n (Nn) 404. Although shown with a particular number of nodes and a particular number of levels, data structure 400 can include more or fewer nodes and/or more or fewer levels than shown in FIG. 4. Data structure 400 can be implemented to manage access to a service. A node can store access information and other information used to determine authorization based on the access information. For example, each node can include information used for managing access to a service for an account. In some embodiments, a node can include information corresponding to access to a feature of a service (e.g., access information). A hierarchical data structure separate from data structure 400 can be implemented to manage access to a different service and/or feature of a service. A separate data structure can include different nodes (e.g., node Nn 404), and/or different levels of nodes. Examples of nodes are described below including references to FIG. 5.

In some embodiments, such as those shown in FIG. 4, data structure 400 can include multiple levels of nodes, each level including one or more nodes. For example, data structure 400 as shown in FIG. 4, can include a first level of nodes (e.g., master nodes). In this example, N1 402 can correspond to a master node. A master node can store information used to determine access to one or more services, one or more features, or combinations thereof. In the example shown in FIG. 4, N1 402 can store information used to determine access to a service provided by a service management system, e.g., message management service 200 or online content management service 130.

A master node, e.g., N1 402 can store a security key (e.g., a master security key or parent security key) that is used to determine access to a service. The security key can be used to generate access information (e.g., derived security keys or child security keys), each of which can be derived based on the master security key. The master security key can be used to generate or derive other security keys for access to the service, but may not itself be used to obtain access to the service. The master security key can correspond to a random number or a value produced by a hash operation or function. Data 500 in FIG. 5 shows an example of a master node, such as N1 402. Access node 412 can include information indicating a type of service managed using data structure 400.

The master security key in a master node, N1 402, can be used to derive access information (e.g., one or more security keys) to grant access to the service. In some embodiments, the master security key can be used to generate access information to access the service. A security key can correspond to a random number or value produced by a hash operation. A security key (e.g., derived security key) generated based on the master security key can be used to grant access to the service. As such, each derived security key can be a descendant of the master security key. By using a master security key, a process for determining access information to access a service can be protected from recreation or duplication by other computing systems or clients. Each derived security key can be stored as access information in a different electronic image, which can be used to request access to the service.

In some embodiments, a master node (e.g., N1 402) can include information identifying nodes associated with the master node. An example of the information stored by master node N1 402 is shown in FIG. 5. A master node, such as N1 402, can include information identifying one or more additional levels of nodes (e.g., access nodes), such as the second level of nodes (e.g., nodes N2 412, N3 414, and N4 416), and a third level of nodes (nodes N5 422, N6 424, N7 432, N8 434, N9 442, N10 444). Each of node in the second level of nodes and/or the third level of nodes can include information indicating a type of access to the service controlled by N1 402. A node in a third level of nodes can be associated with a node in the second level of nodes. For example, nodes N5 422 and N6 424 can be associated with node N2 412, nodes N7 432, N8, 434, and N9 442 can be associated with node N3 414, and node N10 444 can be associated with node N4 416. The relationship between nodes in different levels is explained further below.

Each of the second level nodes can correspond to an access node that includes information indicating access to the service controlled by N1 402. For example, each node of the second level of nodes can include a security key that is generated based on the master security key. Each of the security keys generated based on the master security key can be used to access the service indicated by the N1. In some embodiments, N1 402 can include information to manage access to the service based on each key in the nodes N2 412, N3 414, and N4 416. The information can indicate whether access to the service is granted or denied using each key in the N2 412, N3 414, and N4 416. Message management service 200 can modify contents of master N1 402 to revoke access to a service granted using the key in any of the nodes N2 412, N3 414, and N4 416. Access can be revoked for any number of reasons. For example, access to service can be revoked when an account is not being used in a manner that satisfies criteria related to use of the service.

In some embodiments, a master node, e.g., N1 402, can include other information to manage access to a service. For example, N1 402 can include information indicating a number of derived security keys generated based on the master security key. Each security key can be stored in an electronic image that can be sent to one or more users to access the service. In some embodiments, N1 402 can include information indicating one or more criteria for generating security keys based on the master security key. The one or more criteria can be used to regulate a number of users to access the service for a release. For example, the one or more criteria can include a maximum number of security keys that can be generated. The one or more criteria can be evaluated to determine whether more security keys can be generated to provide access to the service.

A node in the second level of nodes can be implemented using a data structure. For example, N2 412 of FIG. 5 is shown with examples of information that can be stored in a second level node. N2 412 can include information corresponding to a security key derived from the master security key of N1 402. In some embodiments, can be part of a second level of nodes. In some embodiments, each derived security key can be associated with access to the service. The access can vary between each security key, such that each security key can grant access to a feature of the service, rather than the entire service. N2 412 can include information indicating a type of access to the service.

A security key corresponding to a node of the second level of nodes can be used to manage access to a service. The security key can be included as access information in an electronic image that is sent to one or more users to access the service. When access is requested using the electronic image, the security key can be verified by the access management system to determine whether to grant authorization based on the security key. In some embodiments, the node with the security key will be located to determine authorization to access the service based on the security key. As will be explained below, an account can obtain access to service based on a security key corresponding to a node of the second level of nodes N2 412, N3, 414, N4 416. For example, N2 412 stores account information indicating an account that has obtained access to the service using the security key of N2 412. N2 412 can be inspected to determine whether the security key associated with the node, e.g., N2 412, has been associated with an account, and therefore, used to access a service.

In some embodiments, N2 412 can be modified by an operator of an access management system to manually indicate whether access is permitted to a service. Access can be revoked for any number of reasons. For example, access to service can be revoked when an account is not being used in a manner that satisfies criteria related to use of the service. In some embodiments, an ancestor node (e.g., a parent node) of a second level node can be inspected to determine whether access can be granted using the security key of the second level node.

In some embodiments, N2 412 can include information indicating one or more criteria for accessing a service. For example, the criteria can indicate a feature of the service that is accessible. The criteria can indicate requirements (e.g., usage of a service) for obtaining access or maintaining access to a service. In some embodiments, the security key can be sent to a user to access the service when the criteria have been satisfied.

In some embodiments, N2 412 can include information indicating one or more descendant nodes (e.g., child nodes) related to the node (e.g., the parent node) corresponding to N2 412. For example, N2 412 can indicate nodes of another level, such as child nodes N5 422 and N6 424 of N2 412. A child node can correspond to a node providing access that is shared by an account of the parent node. The security key corresponding to the child node could have been included in an electronic image shared by an account associated with the parent node. In other words, a child node can indicate access based on a security key given by another account. In some embodiments, a security key of a child node can be given to users based on actions performed by an account associated with the parent node. The actions can be defined by the criteria in N2 412. In some embodiments, a security key of a child node can correspond to access to a particular feature of the service. The access can be granted to an account associated with the parent node. As such, the child node can be associated with the parent node based on access granted to the same account. In some embodiments, multiple child nodes may be associated with a node of the second level of nodes when multiple security keys are used to access a service. In some embodiments, multiple security keys may be needed to access a service. Each security key may be provided to a user in a different electronic image. The electronic images may be used to request access to the service. When access is granted using multiple security keys, the security keys may be associated with an account that shared the keys or that is granted additional access using the security keys.

As shown in FIG. 5, N6 424 is an example of a node in the third level of nodes implemented using a data structure. N6 424 can include information similar to information in N2 412. In the example shown in FIGS. 4 and 5, N6 424 does not indicate child nodes because N6 424 is not associated with a child node. Similar to N2 412, N6 424 can indicate the master node N1 402 as the node containing the master security key. The master security key could have been used to generate the security key in N6 424. In some embodiments, a security key of a node can be generated based on the security key of ancestor nodes. For example, the security key of N6 424 can be generated based on the security key of N2 412 corresponding to N2 412 and the master security key of N1 402.

In some embodiments, authorization to access a service can be determined using data structure 400. For example, authorization can be determined by finding a node in data structure 400 that includes a security key matching a security key received in a request to access a service using an electronic image. In some embodiments, the security key in the nodes of data structure 400 can be stored in a table such that a lookup operation can be performed to identify a matching security key if one was generated. For example, nodes of the second level of nodes can be searched to find a node with a matching security key. Authorization can be granted upon determining whether access has already been granted using the security key. Such a determination can be made by examining a node to determine whether a node includes information indicating an account that has been granted access to the service. Such information can indicate that the security key has been used. In some embodiments, a node of the second level of nodes can include information indicating a threshold number of users that can access the service using the security key of the node. Authorization can be determined based on whether access has been granted to the threshold number of accounts using the security key of the node. In another example, authorization to access a service can be determined based on performing a checksum operation in a manner as the security key could have been generated for a node.

Figure 6:
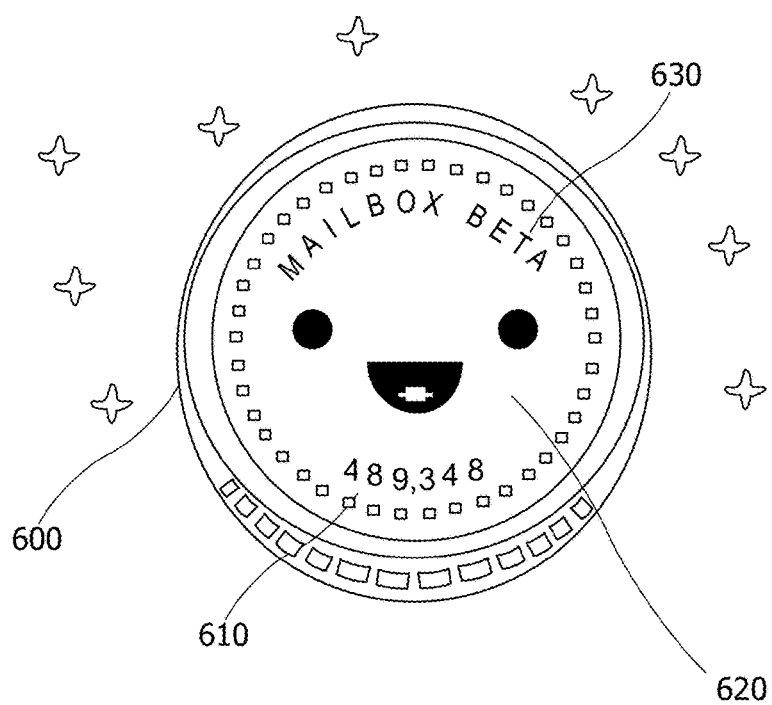
FIGS. 6 and 7 show examples of an electronic image for managing access to a service management system according to an embodiment of the present invention.
Figure 7:
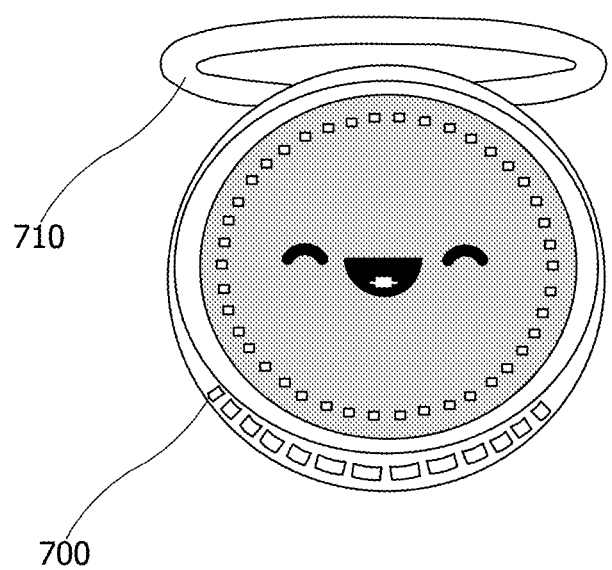

FIGS. 6 and 7 show examples of electronic images that can be generated according to an embodiment of the present invention. Now referring to FIG. 6, electronic image 600 is an example of an electronic image that can be generated by access management system 140. Electronic image 600 may be received by a client device, e.g., client device 300. Electronic image 600 can be displayed by client device 300 in application interface 332. For example, electronic image 700 may be displayed in an email message displayed in an email application. When displayed, electronic image 600 may be rendered as having an appearance of a coin, or some other displayable object. In some embodiments, electronic image 600 can be displayed with color, animation, motion, or other types of appearance (e.g., face of an animated character 620).

In some embodiments, information 610 included in electronic image 600 can indicate a value related to accessing a service. In some embodiments, information 610 can indicate a value (e.g., an electronic image number) that identifies electronic image 600. Information 610 can indicate a date and/or a time when electronic image 600 was issued (e.g., generated or sent to a device). The value can indicate a level of type of access to a service, a usage status of the access information, or other information related to access provided by information in electronic image 600. Information 610 can be related to generation of electronic image 600. For example, information 610 may indicate a value that distinctly identifies electronic image 600 from other electronic images derived based on a master node, e.g., N1 402. In some embodiments, all or part of the value indicated by information 610 may be similar to a value indicated by information included in other electronic images. For example, electronic images derived based on the same node, e.g., a master node or an access node, may include information indicating a value corresponding to a feature or a service accessible using those electronic images. The information included in an electronic image may be different from information included in electronic images that are derived based on a different node, e.g., access node or master node. For example, the information may be different where electronic images are generated based on different nodes, each of which is used to derive access information for a different service or feature.

As explained above, electronic image 600 can include information indicating a usage status of access to a service using the access information included in electronic image 600. The usage status can indicate use of the access information to access the service. An appearance of electronic image 600 can correspond to the status indicated by the information included in electronic image 600. The information can correspond to a status and/or type of access to a service, e.g., message management service 104. For example, the usage status can correspond to use of the electronic coin to access a message management service, e.g., message management service 200. When electronic image 600 is displayed, an appearance of electronic image 600 can indicate a type of access that is or has been granted to its user. For example, an appearance of electronic image 600 can change to indicate a change in usage status of electronic image 600. In some embodiments, electronic image 600 can have identifier 630, which identifies a name, a type of access, a service (e.g., a message management service) that can be accessed, or combinations thereof. In some embodiments, identifier 630 can correspond to access information or it may not correspond to access information.

Now turning to FIG. 7, an example is shown of electronic image 700 generated by access management system 140. Electronic image 700 can be displayed in application interface 332 of client device 300. For example, electronic image 700 may be displayed in an email message displayed in an email application. Client device 300 can render electronic image 700 in application interface 332. Electronic image 700 may be rendered with an appearance that indicates a status corresponding to its use to access a service, e.g., message management service 200. In contrast to FIG. 6, electronic image 700 has appearance 710 that can be different from electronic image 600. In this example, appearance 710 can indicate use of electronic image 700 to access a service. For example, appearance 710 can have an appearance (e.g., a coin with a halo and a greyed-out color), which indicates that electronic image 700 is disabled or inactive, such that it cannot be used to access a service because it has been used.

Figure 8:
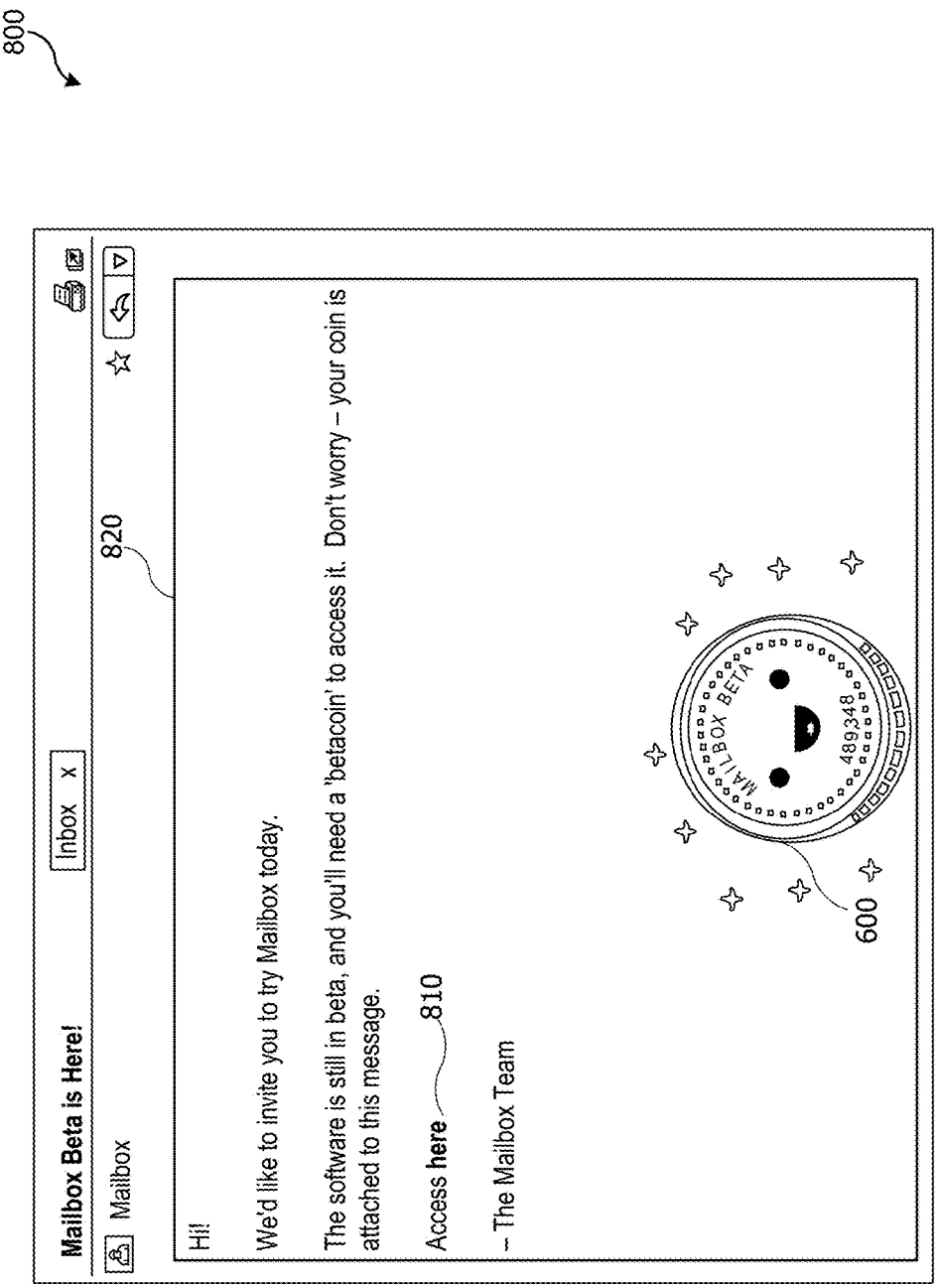
FIG. 8 shows an example of an interface displaying an electronic message that including an electronic image according to an embodiment of the present invention.

FIG. 8 shows an example of interface 800 displaying an electronic message 820 that including an electronic image (e.g., electronic image 600) according to an embodiment of the present invention. Interface 800 can be displayed in application interface 332 of client device 300. In some embodiments, interface 800 can be generated by a service, such as message management service 104. Interface 800 can be provided as part of an app distributed by message management service 104 to one or more clients by which the interface 800 can be displayed. Message 820 can be distributed to an account associated with a user. An account can be one provided by a service (e.g., message management service 104) or can correspond to an account (e.g., an email account) provided by a messaging service. Message 820 can be distributed to a user to invite the user to access (e.g., join) a service, e.g., message management service 104. In some embodiments, message 820 can include electronic image 600. Message 820 can include information 810 enabling access to an application or an interface, which can enable a user to access a service using electronic image 600. For example, information 810 can correspond got a location (e.g., a URL or a location in memory) to access or install an application. Electronic image 600 can be used (e.g., interacted with) in such an application or the interface to request access to a service.

Figure 9:
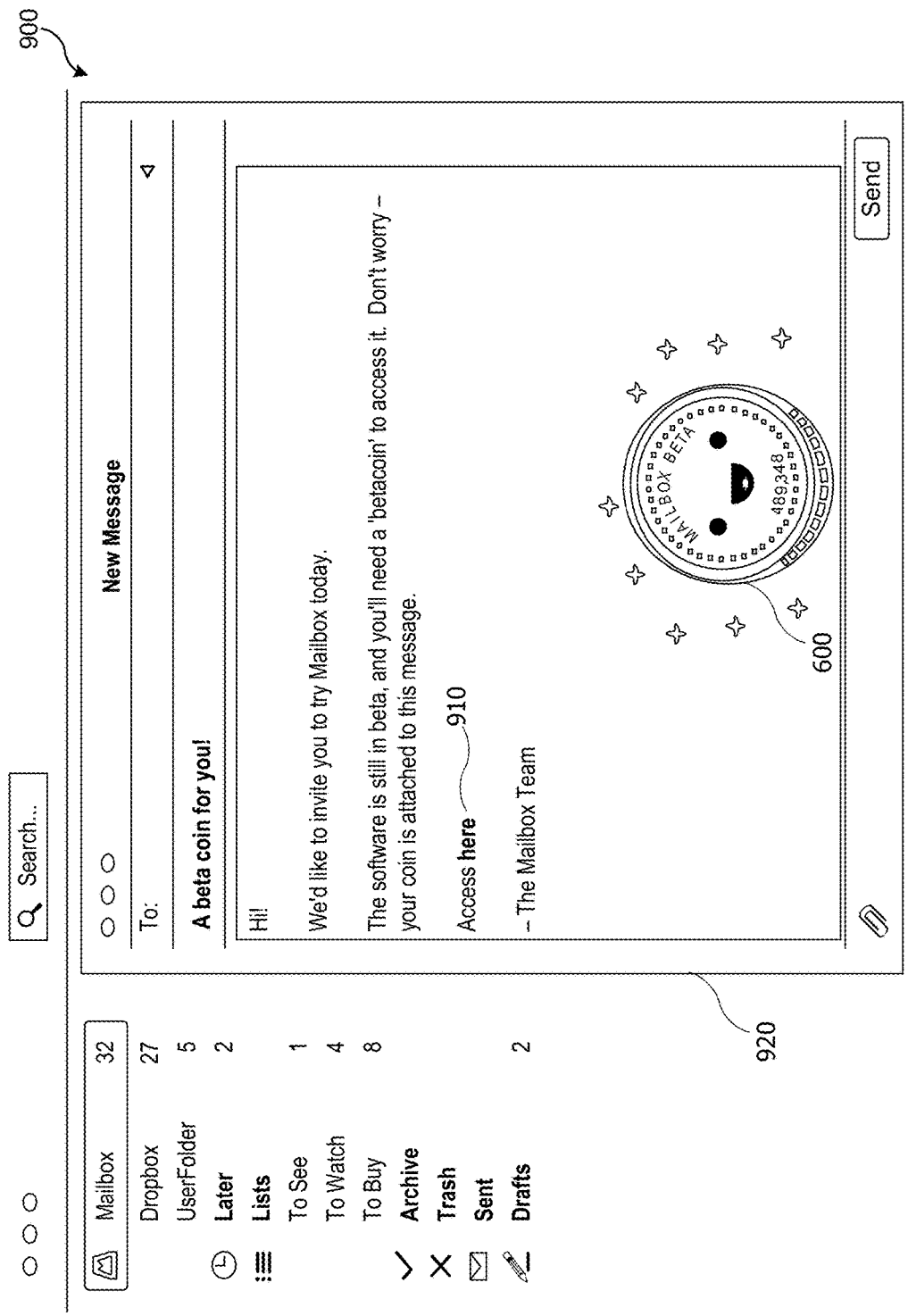
FIG. 9 shows an example of an interface displaying an electronic message including an electronic image according to an embodiment of the present invention.

FIG. 9 shows an example of interface 900 displaying an electronic message (e.g., electronic message 920) including an electronic image (e.g., electronic image 600) according to an embodiment of the present invention. Interface 900 can be displayed in application interface 332 of client device 300. In some embodiments, message 920 can be different from message 820 with regard to content of message 920. Message 920 can be directed to an existing user of a service, e.g., a message management service. Message 920 can include electronic image 600 to invite a user (e.g., a recipient of message 920) to use the service more or to use a new or different feature of the service. Similarly, message 920 can include information 910 enabling access to an application or an interface, which can enable a user to access a service using electronic image 600. For example, information 910 can correspond got a location (e.g., a URL or a location in memory) to access or install an application. In some embodiments, message 920 can be displayed in interface 900. Interface 900 can be a graphical interface, which is presented at a computing device. Interface 900 can be presented in an application, e.g., an application provided by a service. In some embodiments, message 920 can be a new message (e.g., a forwarded message) to be sent to other users to invite users to access a service using electronic image 600. New users can access an application via information 910. The application can enable a user to access service using electronic image 600.

Figure 10:
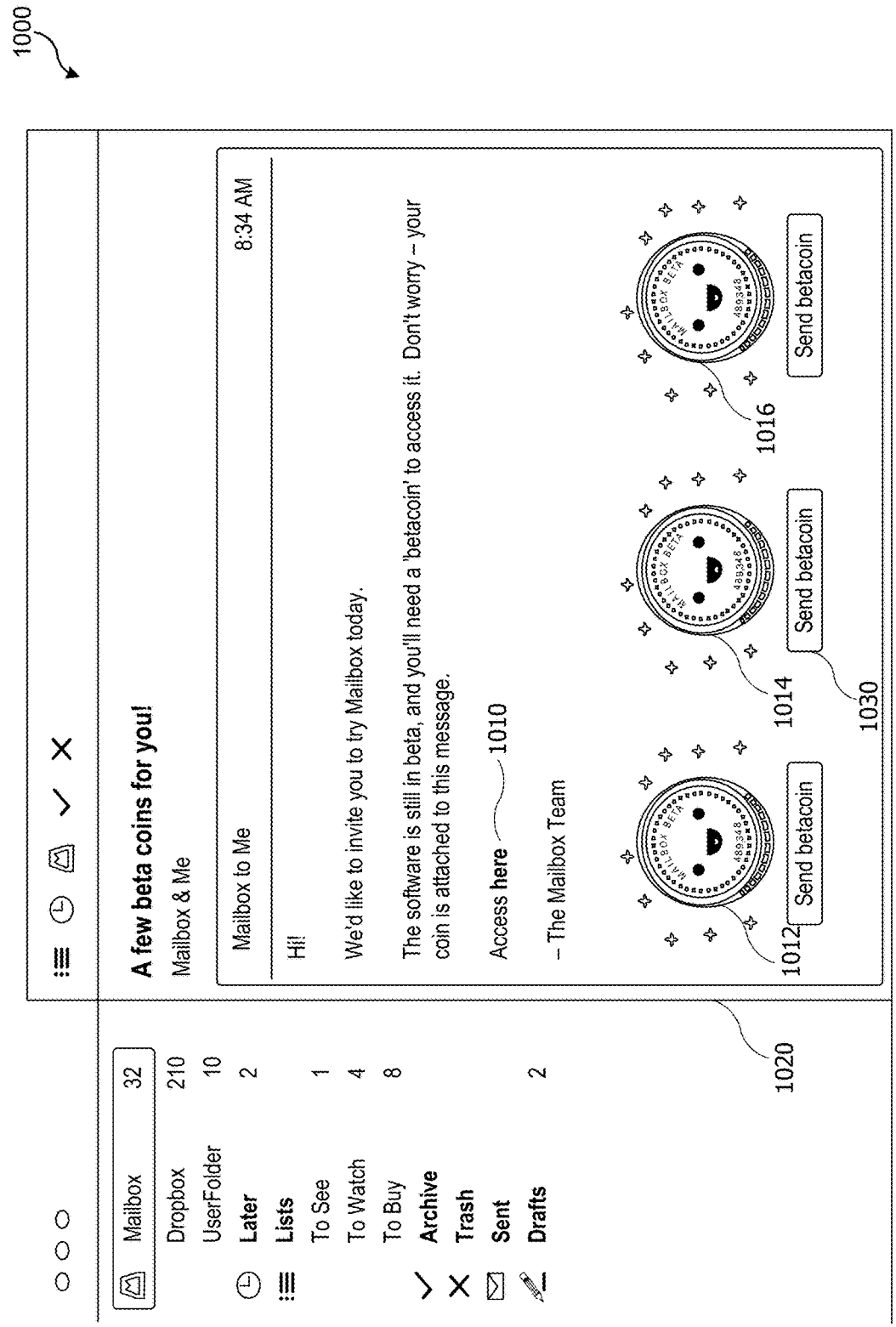
FIG. 10 shows an example of an interface displaying an electronic message including multiple electronic images according to an embodiment of the present invention.

FIG. 10 shows an example of interface 1000 displaying an electronic message (e.g., electronic message 1020) including multiple electronic images (e.g., electronic image 1012, electronic image 1014, and electronic image 1016) according to an embodiment of the present invention. Interface 1000 can be displayed in application interface 332 of client device 300. Similar to message 920, message 1020 can invite a user to access a service, e.g., message management service 104, using one or more electronic images 1012, 1014, 1016. Multiple electronic images 1012, 1014, 1016 can be received in message 1020. Multiple electronic images can be given to a user by a service based on a user's actions to encourage a user to use a service in a particular manner or can be given to the user to invite other users to access the service. Multiple electronic images 1012, 1014, 1016 can be shared with other users. In some embodiments, each electronic image 1012, 1014, 1016 can grant access to a single account. For example, an electronic image can be shared with other users (e.g., by sending the image in a message to another account); however, access can be restricted to the criterion corresponding to the access information. An electronic image can be distributed to one or more people via a message and/or an application. In some embodiments, multiple electronic images can be redeemed to request access to a service.

In some embodiments, message 1020 can include an interactive element (e.g., a control), such as information 1010 enabling access to an application or an interface, which can enable a user to access a service. For example, information 1010 can correspond got a location (e.g., a URL or a location in memory) to access or install an application. Information 1010 can facilitate access to a service, such as causing an application to be received (e.g., downloaded and/or installed) by the client. The application can enable a user to request access to service using one or more of electronic images 1012, 1014, 1016.

In some embodiments, message 1020 can include an interactive element (e.g., a control), such as link 1030. Link 1030 can enable a user to generate a message or send a request to share one or more electronic images 1012, 1014, 1016 to other users. In some embodiments, although an electronic image can be shared with different users, access can be controlled such that a certain number of users can use the electronic image to access the service.

Figure 11:
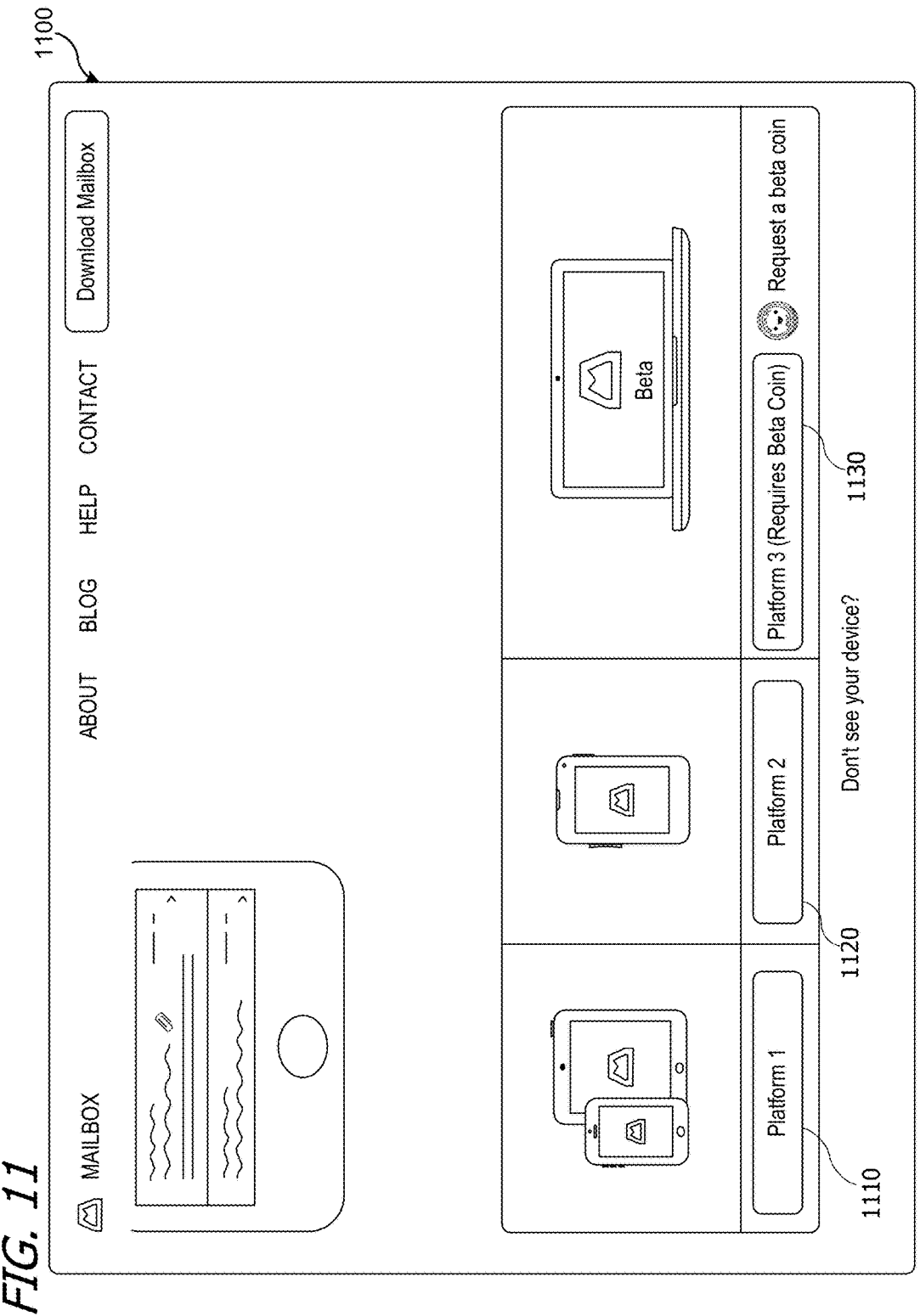
FIG. 11 show an example of an interface to choose a computing environment for accessing a message management service according to an embodiment of the present invention.

FIG. 11 shows an example of interface 1100 to choose a computing environment for accessing a message management service (e.g., message management service 200) according to an embodiment of the present invention. Interface 1100 can be displayed in application interface 332 of client device 300. Interface 1100 can include one or more graphical interfaces. Interface 1100 can be presented in an app. In some embodiments, interface 1100 can be displayed based access using information, e.g., information 810, in a message, e.g., message 820. Using interface 1100, a user can choose a platform or a computing environment in which to install an application to access a message management service. In some embodiments, interface 1100 can be displayed based on determining authorization determined using an electronic image.

In an example shown in FIG. 11, interface 1100 can include interactive element 1110, interactive element 1120, and interactive element 1130, each of which can enable a user to initiate a process for establishing an application on a computing device. Each of interactive elements 1110, 1120, 1130 can enable access to an application-specific environment for accessing a message management service. Client device 300 can present one or more interfaces for accessing the message management service based on the application-specific environment selected by a user. In some embodiments, an interactive element, such as interactive element 1130 can indicate that access can be dependent on having an electronic image (e.g., a coin).

Figure 12:
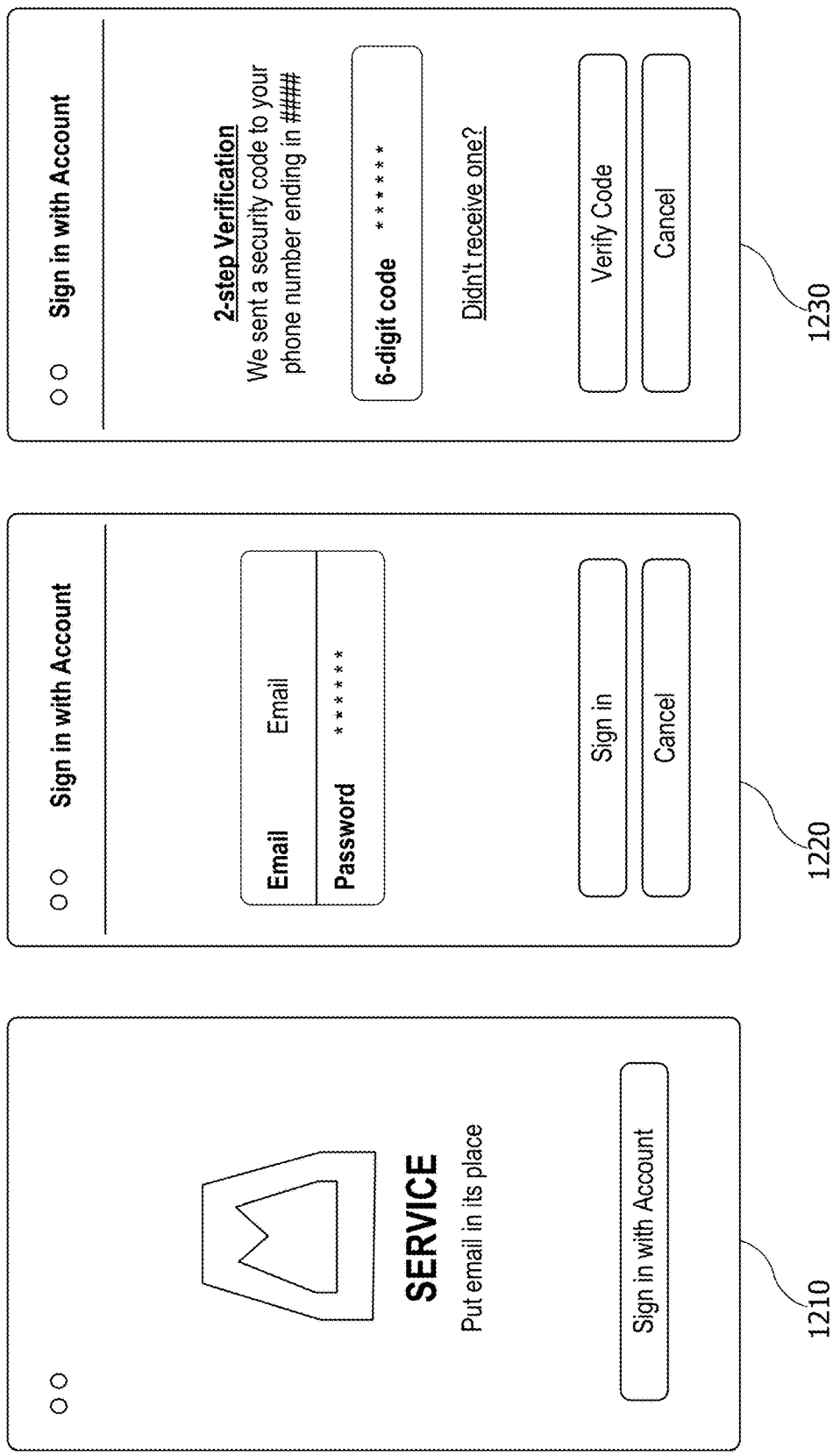
FIG. 12 shows examples of interfaces for accessing a message management service according to an embodiment of the present invention.

FIG. 12 shows examples of interfaces 1210, 1220, 1240 for accessing a message management service according to an embodiment of the present invention. One or more of interfaces 1210, 1220, 1240 can be displayed in application interface 332 of client device 300. In some embodiments, interface 1210 can be presented to enable a user to access (e.g., signin or login) to a service. Interface 1220 can be present one or more interactive elements to receive access information or account information, e.g., an email address and a password, to access a message management service. In some embodiments, access to the message management service can include a two-step verification process by which a user is contacted with a message including a verification code. Interface 1240 can be presented to enable a user to enter a verification code to perform two-step verification.

Figure 13:
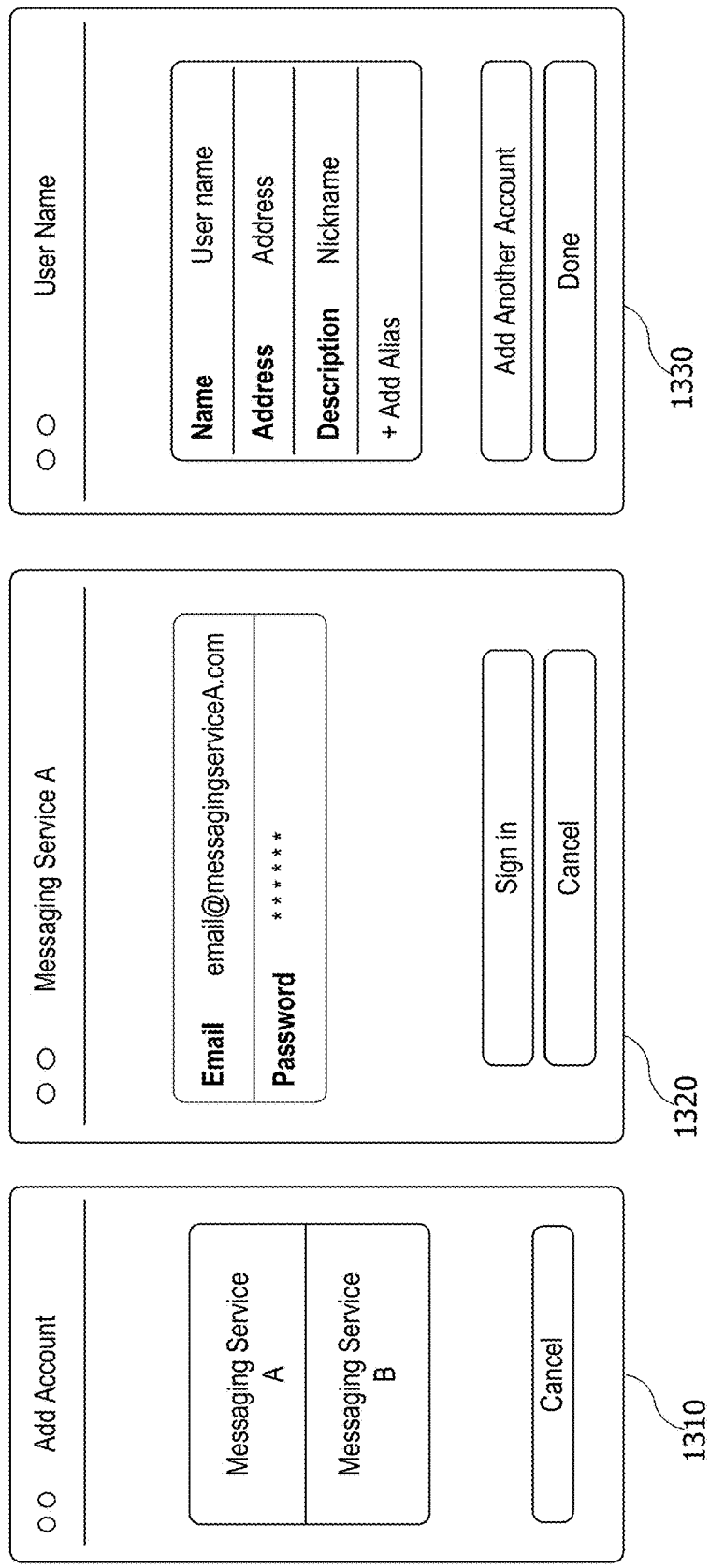
FIG. 13 shows examples of interfaces for inputting account information to access a messaging service via a message management service according to an embodiment of the present invention.

FIG. 13 shows examples of interfaces 1310, 1320, 1330 for inputting account information to access a messaging service via a message management service according to an embodiment of the present invention. One or more of interfaces 1310, 1320, 1330 can be displayed in application interface 332 of client device 300. Interface 1310 can display information about one or more messaging services, e.g., messaging service A 204*a* and messaging service B 204*b*, which are available to be accessed via message management service. The information about a messaging service can be associated with an interactive element, which upon interaction, can cause interface 1320 to be presented. Interface 1320 can include one or more interactive elements to enable a user to specify a messaging account or access information, e.g., an email address and a password, to access a messaging service chosen via interface 1310. Interface 1330 can be presented in response to interaction with interface 1320. Interface 1330 can display one or more interactive elements to enable a user to specify additional information to be associated with a messaging account. The additional information can include information corresponding to an alias, such as a name, an address, and a description of the alias.

Figure 14:
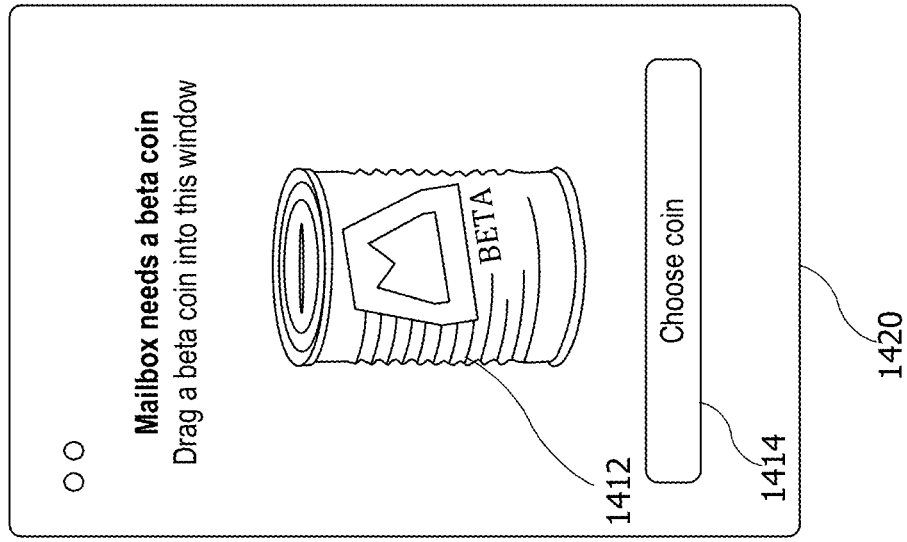
FIG. 14 shows an example of interfaces for requesting access to a message management service according to an embodiment of the present invention.
Figure 14:
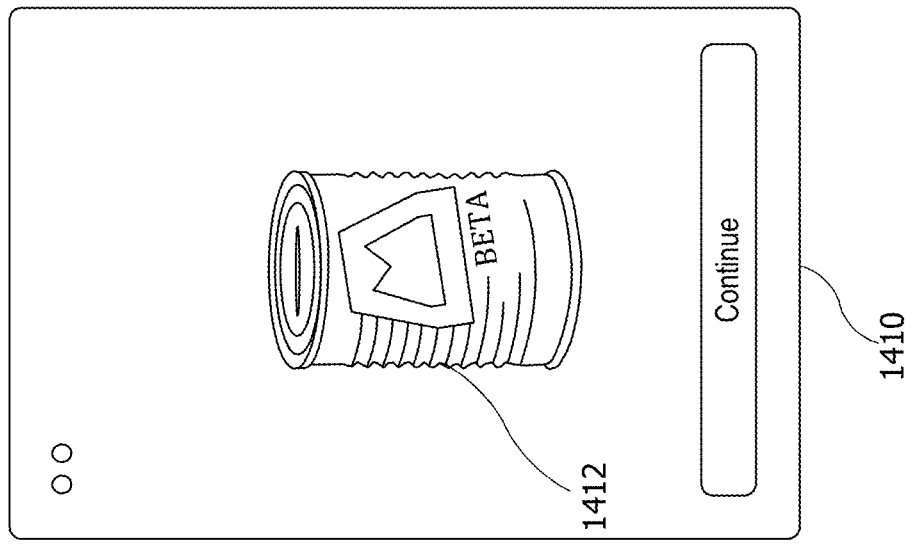

FIG. 14 shows an example of interfaces 1410, 1420 for requesting access to message management service according to an embodiment of the present invention. One or more of interfaces 1410, 1420 can be displayed in application interface 332 of client device 300.

Interface 1410 can be presented to a user at a client upon a request to access a service provided by a message management service. Interface 1410 can include one or more images, e.g., electronic image 1412, of a receptacle for receiving an electronic image. Interface 1420 can enable a user to begin interaction for providing an electronic image (e.g., a coin) to request access to a service. For example, a user can interact with interactive element 1414 in interface 1420 to request to begin interaction for providing an electronic image. In some embodiments, interactive element 1414 can enable a user to select a location of an electronic image (e.g., a location in storage) or to interact with interface 1420 to provide input indicating an electronic image.

Figure 15:
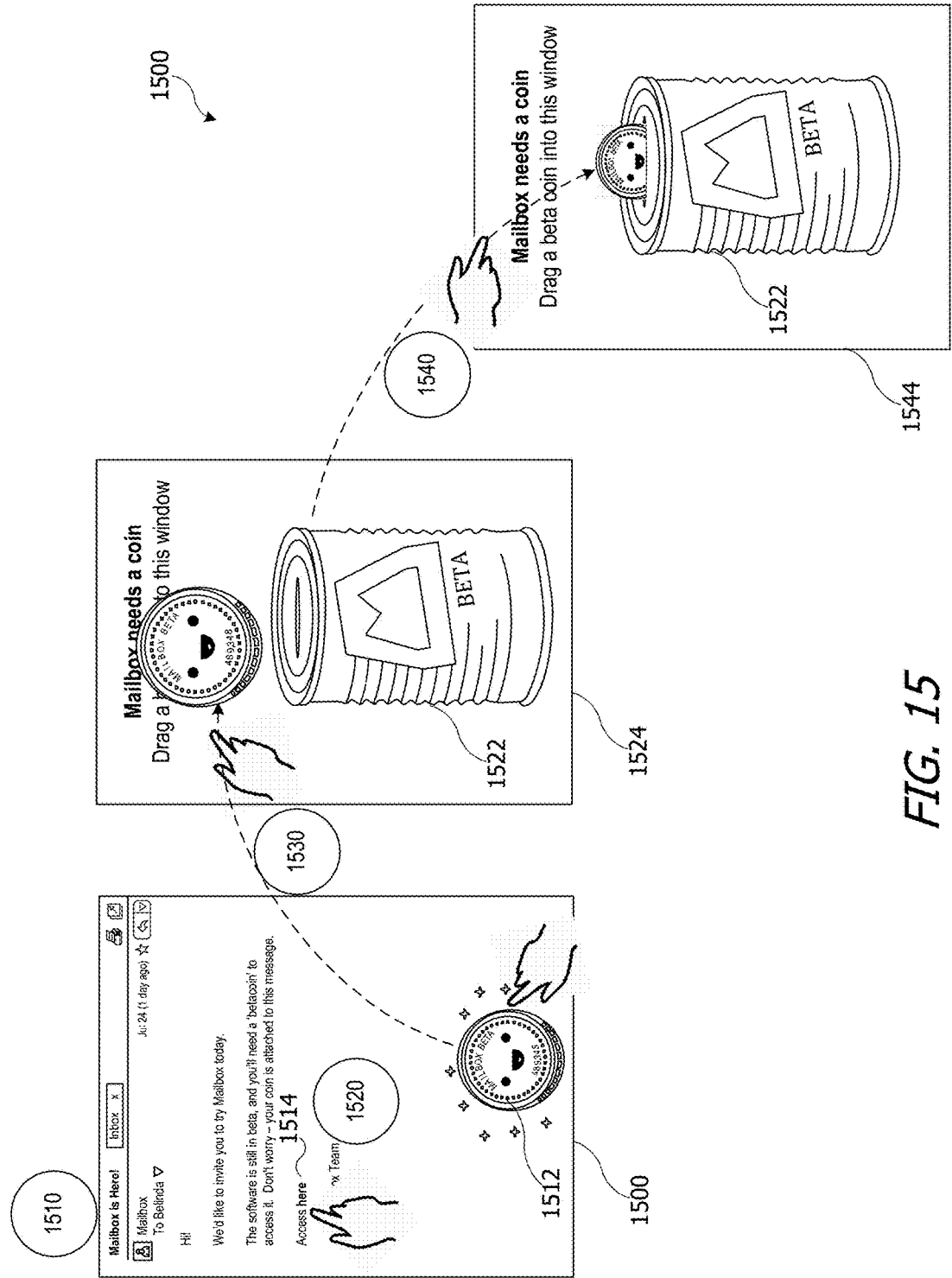
FIG. 15 shows an example of a process for requesting access to a message management service using an electronic image according to an embodiment of the present invention.

FIG. 15 shows an example of process 1500 requesting access to a message management service using an electronic image according to an embodiment of the present invention. Process 1500 can be implemented by a client, e.g., client device 300. FIG. 15 shows a sequence of interfaces that can be displayed by a client that implements process 1500.

For example, process 1500 can begin at step 1510 by displaying interface 1500 that includes a message. The message can include an electronic image, such as an electronic image of a coin 1512. The message can invite a recipient of the message to use the electronic image to request access to a service, e.g., a message management service. Interface 1500 can include information 1514 enabling access to an application or an interface, which can enable a user to access a service using electronic image 1512. For example, information 1514 can correspond got a location (e.g., a URL or a location in memory) to access or install an application.

At step 1520, process 1500 can include user interacting with interactive element 1514 to cause interface 1524 to be displayed. At step 1530, process 1500 can include a user interacting with electronic image 1512. Interaction with electronic image 1512 can include a user requesting use of electronic image 1512 to request access to a message management service. A user can interact with electronic image 1512 to move (e.g., drag) electronic image 1512 within the same interface (e.g., interface 1500) or another interface (e.g., interface 1524) including image 1522, which can receive an electronic image. In one example, a user can drag electronic image 1512 to on or near receptacle 1512 in interface 1524 to request access to the message management service from the client. Step 1530 can include receiving input corresponding to interaction with electronic image 600.

At step 1540, process 1500 can include interface 1524 changing is appearance to that of interface 1544. Interface 1544 can shows electronic image 1512 being received in receptacle 1412. Upon receiving electronic image 1512, the client can send a request to the message management service (e.g., message management service 200) to request access based on electronic image 1512. In some embodiments, the request can include electronic image 1512. Described further below with reference to FIGS. 17 and 18 are processes for accessing a message management service.

In some embodiments, upon receiving authorization to access the service, one or more additional graphical interfaces may be provided to enable access to the service. The additional graphical interfaces may include one or more interactive elements to enable a user to install an application to access the service. FIG. 16 shows an example of an interface of an application enabling a user to access message management service 200 upon receiving authorization via process 1500.

FIG. 16 shows an example of interface 1600 of a message management service according to an embodiment of the present invention. Interface 1600 can be implemented by a client, e.g., client device 300. Interface 1600 is an example of an interface for controlling messages for an account provided by message management service 200. Access to interface 1600 can be provided by a process for accessing a service, e.g., process 1500 of FIG. 15. Redemption of an electronic image can be associated or linked to an account, e.g., an account provided by a message management service.

Figure 17:
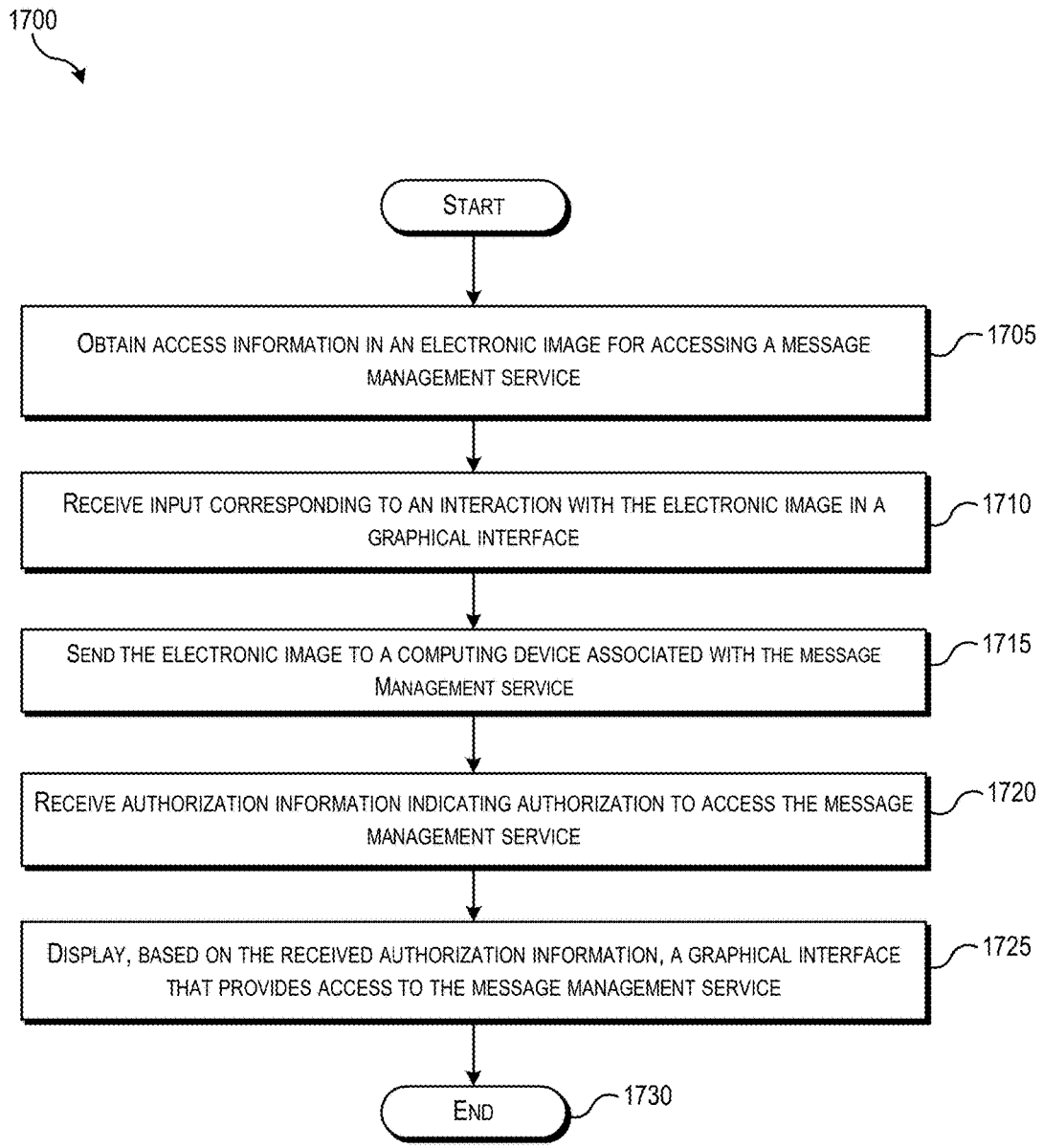
FIG. 17 is a flow diagram of a process for managing access to a message management service using an electronic image according to an embodiment of the present invention.
Figure 18:
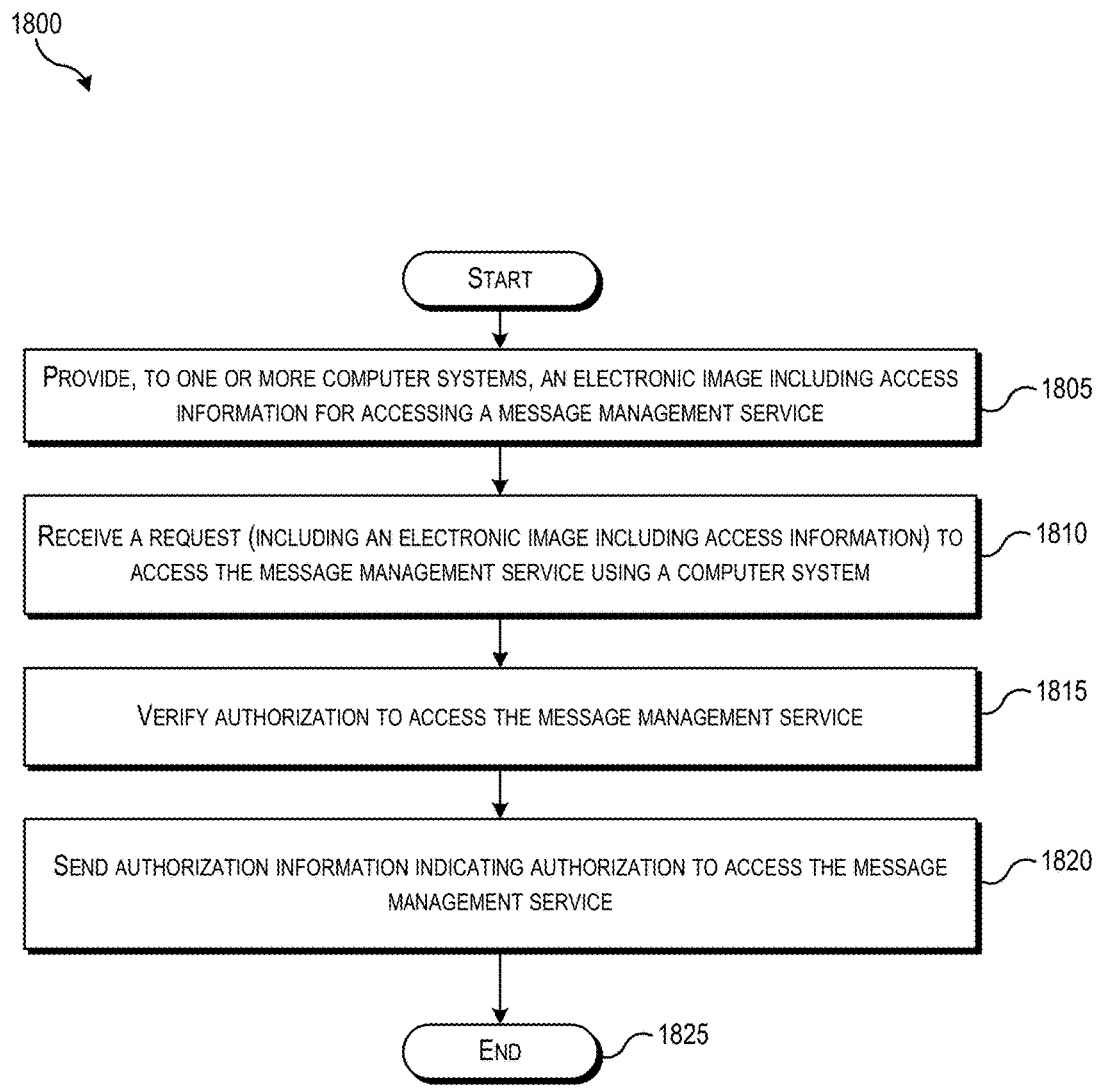
FIG. 18 is a flow diagram of a process for managing access to a message management service using an electronic image according to an embodiment of the present invention.

FIG. 17 shows an example of process 1700 for managing access to a message management service (e.g., message management service 104) using an electronic image, e.g., electronic image 300, according to an embodiment of the present invention. Process 1700 can be implemented by a computer system, such as client 300.

Process 1700 can begin at block 1705 by obtaining an electronic image (e.g., electronic image 600) for accessing a message management service. The electronic image can include access information for obtaining access to a message management service. In some embodiments, the electronic image can be obtained in a message received from a messaging service (e.g., messaging service 102). The message can be received by a computing system that has access to messages in a messaging account (e.g., an email account). For example, the access information can be included in metadata of the electronic image. In some embodiments, the electronic image can obtained from local storage of a client. The electronic image may have been received by the client from message management service or some other client.

In some embodiments, the access information can include a security key. The security key can be generated by the message management service. The electronic image can include information about a status corresponding to use of the access information to access the message management service. The status can correspond to use of the access information to access the message management service. For example, the status can indicate whether the electronic image was previously used to access the message management service. In some embodiments, the access to the message management service can include access to install an app on a client device to obtain information about an account provided by the messaging service. In some embodiments, access to the message management service can include access to a feature of the message management service.

At block 1710, process 1700 can include receiving input corresponding to an interaction with the electronic image in a graphical interface (e.g., a "first graphical interface") associated with the message management service. For example, in FIG. 14, client 300 can receive input corresponding to interaction with electronic image 600 (e.g., dragging electronic image 600) in interface 800 associated with message management service 104. Electronic image 600 can be dragged into receptacle 1412 in interface 1420.

In some embodiments, the electronic image can be interactive such that a user can interact with the electronic image by performing one or more interactions, such as clicking, tapping, selecting, pressing, swiping, sliding, dragging, other interactive actions, or combinations thereof. The input received by the interaction can indicate a type of the interaction. In some embodiments, a graphical interface, e.g., interface 1410 of FIG. 14, can be presented at a computing system. The graphical interface can be presented as part of an app. The app can enable a user to request access to the message management service. For example, the graphical interface can include an image, e.g., receptacle 1412. In this example, the electronic image can be dragged or moved in relation to the image in the app. Such an interaction can indicate a request to access the message management service. The access can be based on a right granted based on the access information. In some embodiments, the graphical interface can enable a user to provide account information corresponding to an account provided by a message management service.

At block 1715, process 1700 can include sending, to a computing device associated with the message management service, the electronic image to request access to the message management service. For example, client 300 can send message management service 104 an electronic image (e.g., electronic image 600) to request access to message management service 104 by client 300 using an account associated with a user. In some embodiments, access may be requested from a computer system using an account provided by the message management service. In some embodiments, the electronic image can be sent based on receiving input indicating interaction with the electronic image in a graphical interface. The account can be associated with an account provided by message management service 104. The message management service can determine authorization of the account to access the message management service based on the electronic image sent to message management service. For example, the message management service can determine whether a user that requests access based on the electronic image can have access to the message management service. Verifying the access information can include determining whether access has previously been requested using the access information. In some embodiments, the right to access the message management service using the access information can be granted to certain accounts provided by the message management service.

At block 1720, process 1700 can include receiving, authorization information indicating the authorization to access the message management service using a computer system (e.g., client 300). For example, client 300 can receive authorization information from message management service 104. The authorization information can be sent based on authorization determined using an electronic image sent at block 1715. The authorization information can indicate whether a user of an account can access the message management service for a right granted based on the access information. In some embodiments, the authorization information can indicate certain rights that are authorized for a user associated with an account. The rights can be less than those rights originally granted for access using the access information.

At block 1725, process 1700 can include displaying, based on the received authorization information, a graphical interface (e.g., a "second graphical interface") that provides access to the message management service. In some embodiments, the graphical interface can display information (e.g., one or more messages) corresponding to a messaging account associated with an account provided with access to the message management service. For example, client 300 can display graphical interface 1600 that provides access to messages associated with a messaging account accessed via message management service 104. The graphical interface can be displayed with the first graphical interface in which input was received at block 1710, separate from the first graphical interface, or in a different display of a computing system. In some embodiments, the second graphical interface can be part of an app. The second graphical interface can correspond to a login screen to access the message management service or a specific feature of the message management service. Access to the message management service can be based on the received authorization information. The message management service can display information corresponding to a messaging account associated with the account. For example, the displayed information can include one or more messages in the messaging account.

FIG. 18 is a flow diagram of process 1800 for managing access to a message management service (e.g., message management service 104) using an electronic image, e.g., electronic image 300, according to an embodiment of the present invention. Process 1800 can be implemented by a computer system or a computing device of an access management system, e.g. access management system 140 of FIG. 1. The access management system can be implemented by a service, such as message management service 300, for which access is managed.

Process 1800 can begin at block 1805 by providing, to one or more computer systems, an electronic image including access information. The access information can enable access to a message management service. Each of the one or more computer systems can be associated with one or more users. In some embodiments, an electronic image may be provided to a user by sending, via a messaging service, a message including an electronic image to a messaging account associated with the user. In some embodiments, a request can be sent to a messaging service to instruct the messaging service to send a message including the electronic image. The request can include information identifying recipients, e.g., a messaging account associated with a recipient, to whom the message is to be sent.

The electronic image included in the message can include access information for obtaining access to a message management service. For example, the access information can be included in metadata of the electronic image. The electronic image can include information about a status corresponding to use of the access information to access the message management service. The status can correspond to use of the access information to access the message management service. For example, the status can indicate whether the electronic image was previously used to access the message management service. In some embodiments, the access to the message management service can include access to install an app on a client device to obtain information about an account provided by the messaging service. In some embodiments, access to the message management service can include access to a feature of the message management service.

In some embodiments, the access information can include a security key. The security key can be generated by a message management service. The security key can be associated with a right to access a service. Authorization to access to a service can be verified using the security key. Access to a service using the access information can include access to one or more features or functions of the service. The security key can be generated using a hash operation. In some embodiments, the security key can further protect access by being generated using one or more security keys. For example, the security key (e.g., a derived security key) can be derived based on a descendant key, e.g., a parent or a master security key. Examples of access information are described with reference to FIGS. 4 and 5.

At block 1810, process 1800 can include receiving a request to access the message management service using a computer system. The request can include an electronic image including access information. The request including the electronic image can be received from the computer system for which access is requested or another computer system. For example, the request can be received from a computer system by which the message including the electronic image was received. In some embodiments, the computer system from which the electronic image is received is associated with a messaging account that received the electronic image. In some embodiments, the computer system from which the electronic image is received is associated with the account provided by a service, e.g., message management service 104. As explained above, an electronic image.

At block 1815, process 1800 can include verifying authorization to access the message management service from the computer system. In some embodiments, authorization can be verified for an account provided by a message management service. As explained above, authorization for an account to access the message management service can be verified using the access information in the electronic image received at block 1810. In some embodiments, using the access information, authorization can be verified by performing one or more operations (e.g., a hash operation) using the access information. The access information can be verified by an access management system. For example, access manager 232 can determine whether an account can access the message management service. Access manager 232 can use access information received from a client to verify authorization of an account to access message management service 200 from the client. Verifying authorization to access a message management service can include determining authorization to access a function, a feature, an operation, a method, or combinations thereof. Verifying authorization to access the message management service can include using access information to determine whether the access information has been used (e.g., processed) for a previous request to access message management service 200.

In some embodiments, authorization to access message management service 200 can be verified by performing an operation to lookup the access information in access management cache 240. Access management cache 240 can be searched to determine whether the access information was generated by message management service 200. The operation to lookup the access information can include determining whether the access information is associated with an account, e.g., an account provided by message management service 200, or another service, e.g., online content management service 130. In some embodiments, a certain number of accounts can be used to access the message management service based on the access information. Verification can include determining whether a maximum number of accounts have been associated with the access information. If not, then access can be granted.

At block 1820, process 1800 can include sending authorization information indicating authorization to access the message management service. The authorization may indicate authorization for an account associated with a user to access the message management service. In some embodiments, the authorization information can be sent to a user in a message via a messaging service. The message can include the electronic image, which was used to request access.

In some embodiments, an appearance of the electronic image can change to indicate authorization for an account based on the access information included in the electronic image. For example, an appearance of the electronic image can indicate authorization to access the message management service. An appearance of the electronic image can indicate use of the access information to obtain authorization to access the message management service. The use can indicate whether the access information was used to obtain authorization to access the message management service. The authorization information can enable the user to access the message management service. In some embodiments, the authorization can include a link and/or instructions for accessing the message management service based on the authorization. In some embodiments, the authorization information can include an application, one or more interfaces, or data that can be used to access the message management service based on the authorization.

The authorization information can include information indicating whether authorization to access the message management service has been granted. In some embodiments, the authorization information can indicate one or more functions, features, operations, modes, or combinations thereof, which can be performed based on a grant of access to the message management service. In some embodiments, the authorization information can include additional access information (e.g., a password) to submit when a user logs into the message management service via a graphical interface. The authorization information can include one or more criteria (e.g., a condition) for accessing the message management service. The criteria can include a time, a date, an action, an event, or combinations thereof.

It will be appreciated that processes 1700 and 1800 are illustrative and that variations and modifications are possible. Steps described as sequential can be executed in parallel, order of steps can be varied, and steps can be modified, combined, added or omitted. The processes can be performed by various computer systems, including a client device, a computer system of a message management service, a computer system of a messaging service, and/or a computer system of an online content management service. In some embodiments, different portions of the processes can be performed by different computer systems. For example, all or part of the operations described with reference to FIGS. 17 and 18 can be performed in part by an access management system, a message management service, an online content management service, or combinations thereof.

While the invention has been described with respect to specific embodiments, one skilled in the art will recognize that numerous modifications are possible. For example, while the description above can make reference to email, the invention can be applied to any type of electronic message that can be stored and managed.

Figure 19:
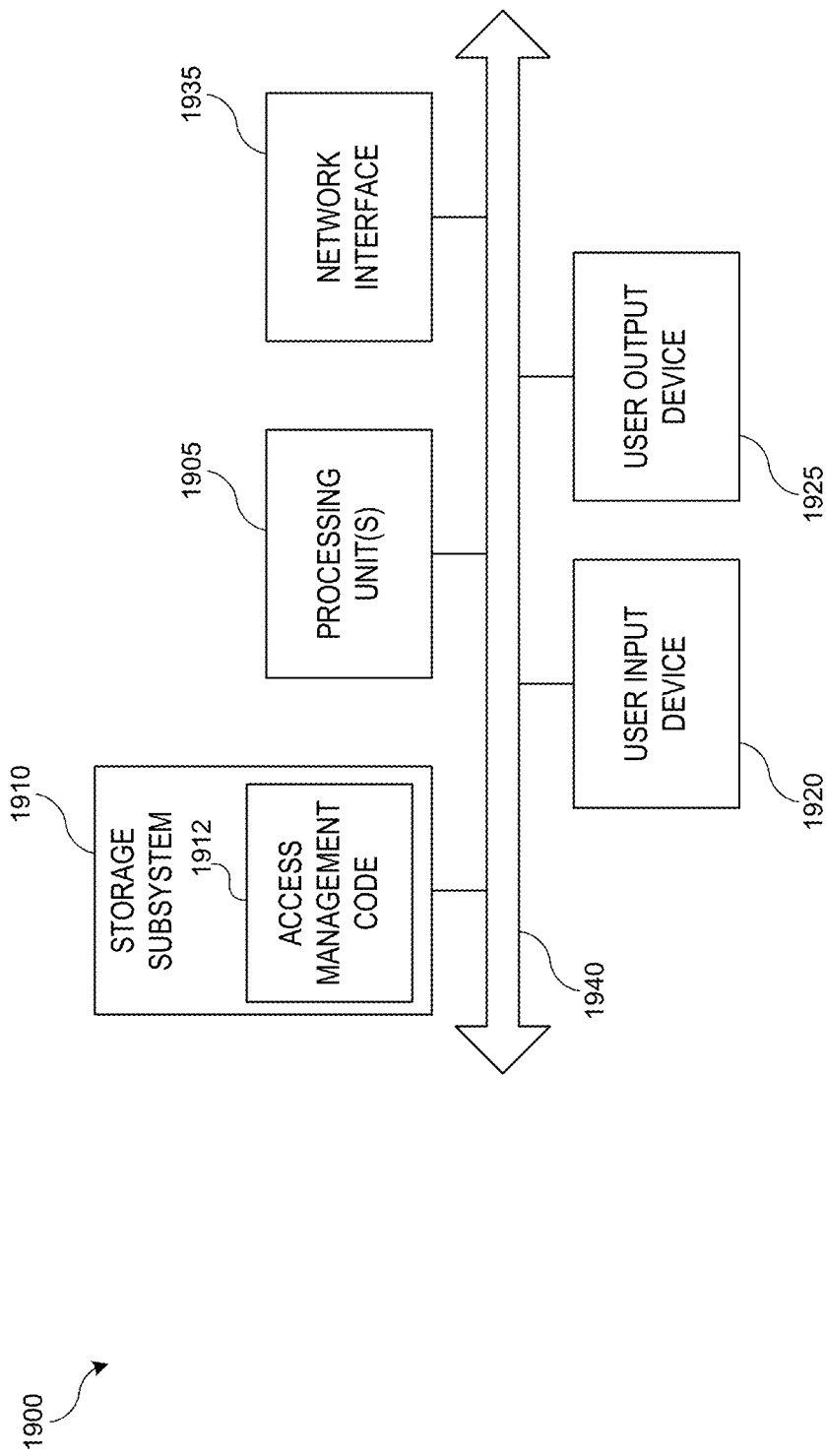
FIG. 19 shows a simplified block diagram of a representative computer system that can be used in an embodiment of the present invention.

Various operations described herein can be implemented on computer systems, which can include systems of generally conventional design. FIG. 19 shows a simplified block diagram of a representative computer system 1900. In various embodiments, computer system 1900 or similar systems can implement a user device (e.g., any of clients 108, 110 of FIG. 1) and/or a server system (e.g., a computer system implementing all or part of messaging service 102, message management service 104, and/or online content management service 130 of FIG. 1). Computer system 1900 can include processing unit(s) 1905, storage subsystem 1910, input devices 1920, output devices 1925, network interface 1935, and bus 1940.

Processing unit(s) 1905 can include a single processor, which can have one or more cores, or multiple processors. In some embodiments, processing unit(s) 1905 can include a general-purpose primary processor as well as one or more special-purpose co-processors such as graphics processors, digital signal processors, or the like. In some embodiments, some or all processing units 1905 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1905 can execute instructions stored in storage subsystem 1910.

Storage subsystem 1910 can include various memory units such as a system memory, a read-only memory (ROM), and a permanent storage device. The ROM can store static data and instructions that are needed by processing unit(s) 1905 and other modules of computer system 1900. The permanent storage device can be a read-and-write memory device. This permanent storage device can be a non-volatile memory unit that stores instructions and data even when computer system 1900 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 1905 need at runtime.

Storage subsystem 1910 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 1910 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic disks, and so on. The computer readable storage media do not include carrier waves and transitory electronic signals passing wirelessly or over wired connections.

In some embodiments, storage subsystem 1910 can store one or more software programs to be executed by processing unit(s) 1905, such as an operating system, a messaging client application, access management code 1912, and so on. For example, where computer system 1900 implements message management service 200 of FIG. 2, access management code 1912 can implement operations or methods described herein as performed by message management service 200. Where computer system 1900 implements client 102 (or other clients) of FIG. 1, access management code 1912 can implement operations or methods described herein as performed by a client. "Software" refers generally to sequences of instructions that, when executed by processing unit(s) 1905, cause computer system 1900 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 1905. Software can be implemented as a single program or a collection of separate programs or program modules that interact as desired. From storage subsystem 1910, processing unit(s) 1905 can retrieve program instructions to execute and data to process in order to execute various operations described herein.

A user interface can be provided by one or more user input devices 1920 and one or more user output devices 1925. Input devices 1920 can include any device via which a user can provide signals to computer system 1900; computer system 1900 can interpret the signals as indicative of particular user requests or information. In various embodiments, input devices 1920 can include any or all of a keyboard, track pad, touch screen, mouse or other pointing device, scroll wheel, click wheel, dial, button, switch, keypad, microphone, and so on.

User output devices 1925 can include any device via which computer system 1900 can provide information to a user. For example, user output devices 1925 can include a display to display images generated by computer system 1900. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1925 can be provided in addition to or instead of a display. Examples include indicator lights, speakers, tactile "display" devices, printers, and so on.

In some embodiments, input device 1920 and output devices 1925 can interoperate to provide a graphical user interface ("GUI") that allows a user to interact with computer system 1900 by using an input device to select a control element displayed on the screen (e.g., by operating a pointing device such as a mouse or touching the location where a control element is displayed on a touch screen).

Network interface 1935 can provide voice and/or data communication capability for computer system 1900, including the ability to communicate with various messaging services and/or message management services to access and act upon messages. In some embodiments, network interface 1935 can include radio frequency (RF) transceiver components for accessing wireless voice and/or data networks (e.g., using cellular telephone technology, advanced data network technology such as 3G, 4G or EDGE, Wi-Fi (IEEE 802.11 family standards), or other mobile communication technologies, or any combination thereof), GPS receiver components, and/or other components. In some embodiments, network interface 1935 can provide wired network connectivity (e.g., Ethernet) in addition to or instead of a wireless interface. Network interface 1935 can be implemented using a combination of hardware (e.g., antennas, modulators/demodulators, encoders/decoders, and other analog and/or digital signal processing circuits) and software components.

Bus 1940 can include various system, peripheral, and chipset buses that communicatively connect the numerous components of computer system 1900. Storage subsystem 1910 can include access management code 1912 that is configured to cause processing unit(s) 1905 to manage access to a service as described herein. For example, bus 1940 can communicatively couple processing unit(s) 1905 with storage subsystem 1910. Bus 1940 can also connect to input devices 1920 and output devices 1925. Bus 1940 can also couple computing system 1900 to a network through network interface 1935. In this manner, computer system 1900 can be a part of a network of multiple computer systems (e.g., a local area network (LAN), a wide area network (WAN), an intranet, or a network of networks, such as the Internet. In some embodiments, bus 1940 and network interface 1935 can operate to connect any number of computers together to provide large-scale computing capacity (e.g., server farms) that can communicate with clients through a WAN interface (which can be part of network interface 1935).

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 1905 can provide various functionality for computer system 1900. For example, processing unit(s) 1605 can execute access management code 1912. For example, where computer system 1900 implements a client device, processing unit(s) 1905 can execute a messaging client app that provides an interface operable by the user to interact with messages, including, e.g., any or all of the interface screens described above. Where computer system 1900 implements a server (e.g., all of part of message management service 104, online content management service 130, or messaging service 102 of FIG. 1), processing unit(s) 1905 can execute server applications that receive and respond to client requests and perform other operations described herein as being performable by a server or service.

It will be appreciated that computer system 1900 is illustrative and that variations and modifications are possible. Computer system 1900 can have other capabilities not specifically described here (e.g., mobile phone, global positioning system (GPS), power management, one or more cameras, various connection ports for connecting external devices or accessories, etc.). Further, while computer system 1900 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
obtaining, by a computer system from a messaging service, an electronic image after the electronic image was generated by a message management service the electronic image configured to grant access to at least two or more users, wherein the electronic image includes access information for accessing the message management service and wherein the electronic image is a dynamic image that changes appearance when displayed;

receiving, by the computer system, input corresponding to an interaction with the electronic image in a first graphical interface associated with the message management service, wherein the interaction is between the electronic image and a graphic element presented in the first graphical interface;

in response to receiving the input, initiating, by the computer system, authentication of the access information in the electronic image;

sending, by the computer system, to a computing device associated with the message management service, the electronic image to request access to the message management service, wherein authorization to access the message management service is determined using the access information in the electronic image, wherein the access information included in the electronic image is used to determine whether the electronic image was previously used to access the message management service;

receiving, by the computer system, authorization information granting authorization to access the message management service;

displaying, by the computer system, based on the received authorization information, a second graphical interface that provides access to the message management service;

determining, by the computer system, the electronic image has been previously used to access the message management service; and based on the determination that the electronic image has been used, changing, by the computer system, and appearance of the electronic image.

2. The method of claim 1, wherein the electronic image is sent to request access to the message management service from the computer system by an account provided by the message management service, and wherein the authorization information indicates authorization for the account to access the message management service.

3. The method of claim 2, wherein the account provides access to an online content management service.

4. The method of claim 1, further comprising:
receiving, from the messaging service, a message associated with a messaging account provided by the messaging service, wherein the message includes the electronic image.

5. The method of claim 1, further comprising:
determining, using the electronic image, a status corresponding to use of the access information to access the message management service, wherein the electronic image is displayed in the first graphical interface with an appearance that indicates the status.

6. The method of claim 1, wherein the access information includes a security key that is generated using a hash operation.

7. The method of claim 1, wherein the access information is included in metadata of the electronic image.

8. The method of claim 1, wherein the authorization information grants authorization to access a feature of the message management service, and wherein the second graphical interface provides access to the feature based on the received authorization information.

9. The method of claim 1, wherein the second graphical interface includes one or more interactive elements to install an application to access message management service.

10. The method of claim 1, further comprising:
receiving input corresponding to an interaction with the second graphical interface, wherein the interaction corresponds to a request to the message management service;

sending, to the message management service, data indicating the request; and receiving, from the message management service, an additional electronic image including additional access information for obtaining access to a feature provided by the message management service.

11. The method of claim 10, further comprising:
sending, to the message management service, a request to access the feature, wherein the request includes the additional electronic image;

receiving, from the message management service, additional authorization information granting authorization of the account to access the feature using the computer system; and displaying, based on the received additional authorization information, a third graphical interface that provides access to the feature of the message management service.

12. A computer system comprising:
one or more processors; and
a memory accessible to the one or more processors, the memory storing instructions executable by the one or more processors to:

obtain, by a computer system from a messaging service, an electronic image after the electronic image was generated by a message management service, the electronic image configured to grant access to at least two or more users, wherein the electronic image includes access information for accessing a message management service and wherein the electronic image is a dynamic image that changes appearance when displayed;

receive input corresponding to an interaction with the electronic image in a first graphical interface associated with the message management service, wherein the interaction is between the electronic image and a graphic element presented in the first graphical interface;

in response to receiving the input, initiating, by the computer system, authentication of the access information in the electronic image;

send, to a computing device associated with the message management service, the electronic image to request access to the message management service, wherein authorization to access the message management service is determined using the access information in the electronic image, wherein the access information included in the electronic image is used to determine whether the electronic image was previously used to access the message management service;

receive authorization information granting authorization to access the message management service; and display, based on the received authorization information, a second graphical interface that provides access to the message management service;

determining, by the computer system, the electronic image has been previously used to access the message management service; and based on the determination that the electronic image has been used, changing, by the computer system, an appearance of the electronic image.

13. The computer system of claim 12, wherein the access information includes a security key that is generated using a hash operation.

14. The computer system of claim 12, wherein the instructions are further executable by the one or more processors to:
receive input corresponding to an interaction with the second graphical interface, wherein the interaction corresponds to a request to the message management service;
send, to the message management service, data indicating the request; and
receive, from the message management service, an additional electronic image including additional access information for obtaining access to a feature provided by the message management service.

15. A method comprising:
obtaining, by a computer system from a messaging service, an electronic image after the electronic image was generated by a message management service, the electronic image configured to grant access to at least two or more users, wherein the electronic image includes access information for accessing the message management service, wherein the access information included in the electronic image is used to determine whether the electronic image was previously used to access the message management service and wherein the electronic image is a dynamic image that changes appearance when displayed;
sending, by the computer device, a first request;
receiving, by a computing device of the message management service, the first request to access the message management service using a first computer system, the first request including the electronic image including access information;
verifying, by the computing device, authorization to access the message management service based on the access information in the electronic image, wherein the electronic image interacts with at least a graphic element in an interface presented by the computing device;
in response to receiving the first request, initiating, by the computer system, authentication of the access information in the electronic image; and
sending, by the computing device, to the first computer system authorization information indicating authorization to access the message management service;
determining, by the computer system, the electronic image has been previously used to access the message management service; and
based on the determination that the electronic image has been used, changing, by the computer system, and appearance of the electronic image.

16. The method of claim 15, further comprising:
generating the access information using a security key for accessing the message management service, wherein the access information includes a derived security key that is generated based on the security key.

17. The method of claim 16, wherein authorization is verified using the derived security key and the security key.

18. The method of claim 15, wherein verifying authorization includes determining whether access to the message management service has previously been authorized using the access information.

19. The method of claim 15, further comprising:
determining a status corresponding to use of the access information to access the message management service, wherein the electronic image includes the determined status.

20. The method of claim 15, further comprising:
receiving, from a second computer system, a second request to access the message management service, the second request including the electronic image that includes the access information;
determining that authorization to access the message management service has already been granted based on the access information; and
sending, to the second computer system, a message indicating that authorization to access the message management service from the second computer system is denied.

21. A non-transitory computer readable medium including one or more sequences of instructions which, when executed by one or more processors, cause the one or more processors, to perform operations:
obtaining, by a computer system from a messaging service, an electronic image after the electronic image was generated by a message management service, the electronic image configured to grant access to at least two or more users, wherein the electronic image includes access information for accessing the message management service, wherein the access information included in the electronic image is used to determine whether the electronic image was previously used to access the message management service and wherein the electronic image is a dynamic image that changes appearance when displayed;
receiving, by the computer system, input corresponding to an interaction with the electronic image in a first graphical interface associated with the message management service, wherein the interaction is between the electronic image and a graphic element presented in the first graphical interface;
in response to receiving the input, initiating, by the computer system, authentication of the access information in the electronic image;
sending, by the computer system, to a computing device associated with the message management service, the electronic image to request access to the message management service, wherein authorization to access the message management service is determined using the access information in the electronic image;
receiving, by the computer system, authorization information granting authorization to access the message management service; and
displaying, by the computer system, based on the received authorization information, a second graphical interface that provides access to the message management service;
determining, by the computer system, the electronic image has been previously used to access the message management service; and
based on the determination that the electronic image has been used, changing, by the computer system, an appearance of the electronic image.

* * * * *

UNITED STATES PATENT AND TRADEMARK OFFICE
CERTIFICATE OF CORRECTION

PATENT NO. : 10,270,780 B2  
APPLICATION NO. : 14/585039  
DATED : April 23, 2019  
INVENTOR(S) : David Barshow et al.

Page 1 of 1

It is certified that error appears in the above-identified patent and that said Letters Patent is hereby corrected as shown below:

In the Claims

Column 38, Line 61, Claim 1, please replace the word "service" with --service,--

Column 41, Line 51, Claim 15, please replace the word "and" with --an--

Signed and Sealed this  
Nineteenth Day of November, 2019

Andrei Iancu  
*Director of the United States Patent and Trademark Office*